(12) United States Patent
Ogawa et al.

(10) Patent No.: US 7,927,520 B2
(45) Date of Patent: Apr. 19, 2011

(54) METHOD FOR LIGHTING APPARATUS AND DISPLAY APPARATUS

(75) Inventors: Yoichi Ogawa, Ibaraki (JP); Masataka Sato, Ibaraki (JP); Katsusuke Shimazaki, Ibaraki (JP); Toshinari Shibasaki, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 26 days.

(21) Appl. No.: 12/155,443

(22) Filed: Jun. 4, 2008

(65) Prior Publication Data

US 2008/0296793 A1 Dec. 4, 2008

Related U.S. Application Data

(62) Division of application No. 11/455,807, filed on Jun. 20, 2006, now Pat. No. 7,396,150.

(30) Foreign Application Priority Data

| Jun. 20, 2005 | (JP) | ................................. 2005-179786 |
| Jun. 24, 2005 | (JP) | ................................. 2005-185510 |
| Sep. 13, 2005 | (JP) | ................................. 2005-265043 |

(51) Int. Cl.
*B29D 7/01* (2006.01)
*B29D 11/00* (2006.01)
(52) U.S. Cl. ........ 264/1.34; 264/1.36; 264/1.9; 264/446
(58) Field of Classification Search .................. 264/1.34, 264/1.36, 1.9, 446
See application file for complete search history.

(56) References Cited

U.S. PATENT DOCUMENTS

| 4,172,219 A | 10/1979 | Deml et al. |
| 4,509,823 A | 4/1985 | Moriguchi et al. |
| 4,924,356 A | 5/1990 | French et al. |
| 4,927,233 A | 5/1990 | Nakanishi et al. |
| 5,216,543 A | 6/1993 | Calhoun |
| 5,267,062 A | 11/1993 | Bottorf |
| 5,598,281 A | 1/1997 | Zimmerman et al. |
| 6,506,675 B1 * | 1/2003 | Oomiya et al. ............... 438/677 |

(Continued)

FOREIGN PATENT DOCUMENTS

JP   A-2-214287   8/1990

(Continued)

OTHER PUBLICATIONS

Japanese Office Action issued Dec. 15, 2009 for Japanese Application No. 2005-179786 (with translation).

(Continued)

*Primary Examiner* — Philip C Tucker
*Assistant Examiner* — Alison Hindenlang
(74) *Attorney, Agent, or Firm* — Oliff & Berridge, PLC

(57) ABSTRACT

The lighting apparatus includes a light source, a housing that contains the light source inside and has an exit port for outputting light from the light source, and an optical sheet that is placed in the exit port. The optical sheet includes a lens structure that is placed at a light exit side and aligns an output direction of incident light from the light source, a reflector that is placed at a light incident side and reflects light emitted by the light source, and a light transmitting opening that exists in the reflector and transmits incident light from the light source. The light transmitting opening is placed in a position deviated from an optical axis of the lens structure. The display apparatus includes the lighting apparatus.

9 Claims, 19 Drawing Sheets

U.S. PATENT DOCUMENTS

| | | |
|---|---|---|
| 6,633,351 B2 * | 10/2003 | Hira et al. .................... 349/95 |
| 6,788,460 B2 | 9/2004 | Knox et al. |
| 6,870,681 B1 | 3/2005 | Magee |
| 6,974,229 B2 | 12/2005 | West et al. |
| 2001/0012078 A1 | 8/2001 | Hira et al. |
| 2006/0061869 A1 | 3/2006 | Fadel et al. |

FOREIGN PATENT DOCUMENTS

| | | |
|---|---|---|
| JP | A-04-060538 | 2/1992 |
| JP | A-10-241434 | 9/1998 |
| JP | A-2000-171617 | 6/2000 |
| JP | A-2000-284268 | 10/2000 |
| JP | A-2001-201611 | 7/2001 |
| JP | A-2001-305306 | 10/2001 |
| JP | A-2004-281270 | 10/2004 |
| JP | A-2005-148440 | 6/2005 |
| JP | A-2006-284697 | 10/2006 |
| JP | A-2007-065268 | 3/2007 |

OTHER PUBLICATIONS

Japanese Office Action issued in Japanese Patent Application No. 2005-265043, dated Oct. 26, 2010 with English Translation.

* cited by examiner

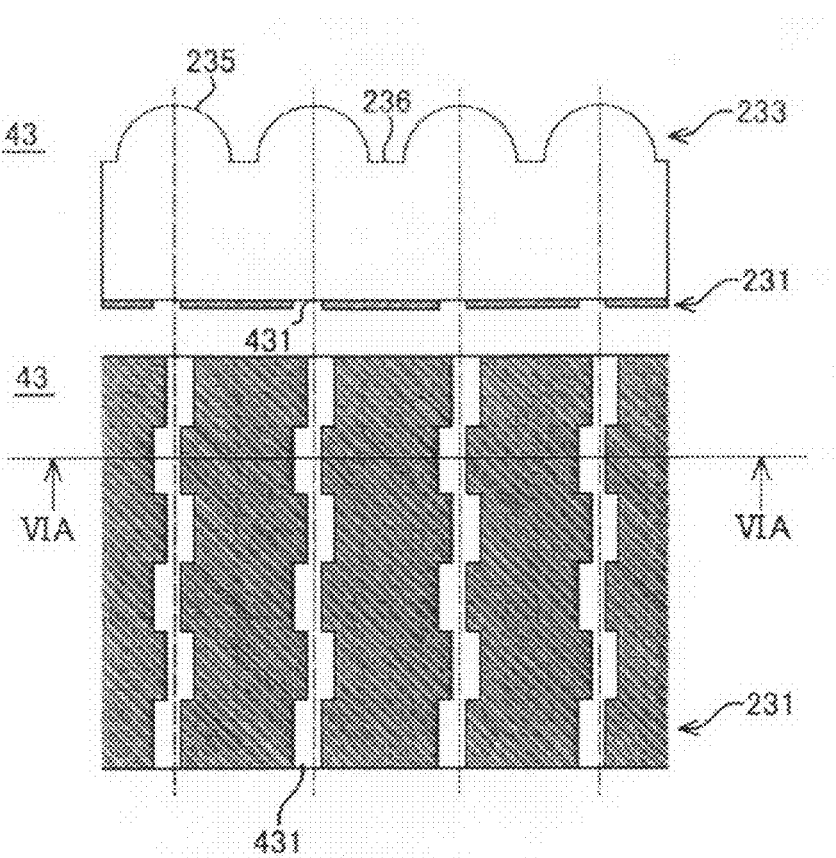
Fig. 6A
Fig. 6B
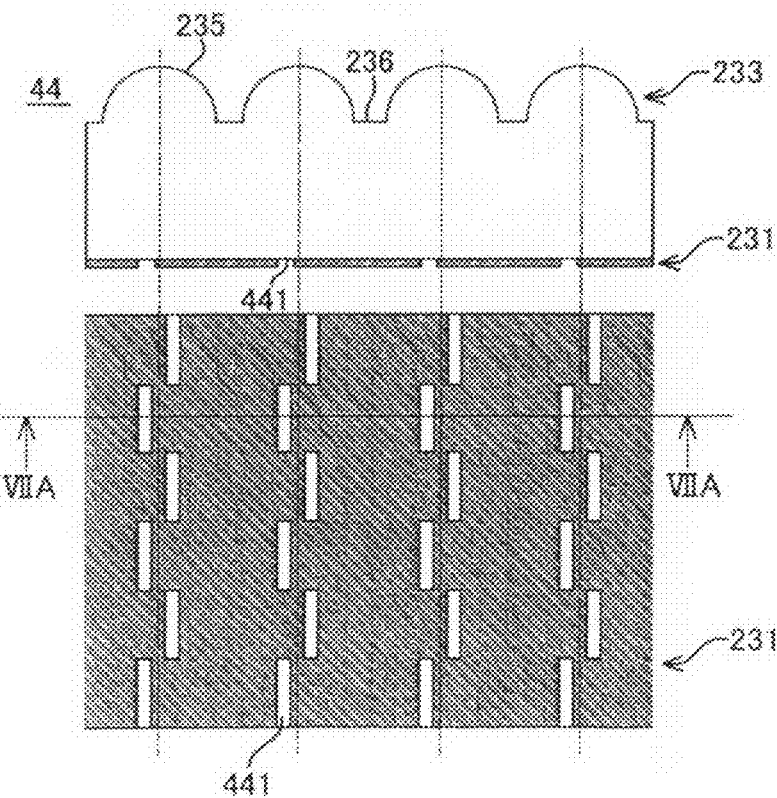
Fig. 7A
Fig. 7B

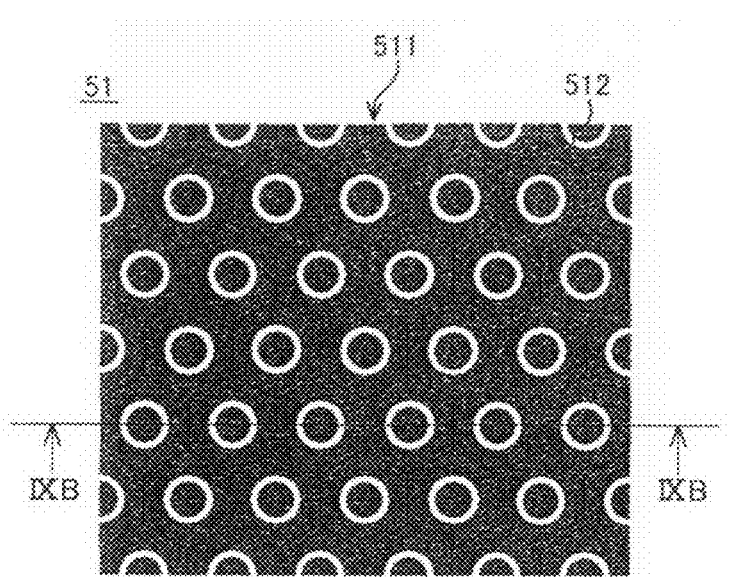
*Fig. 9A*
*Fig. 9B*
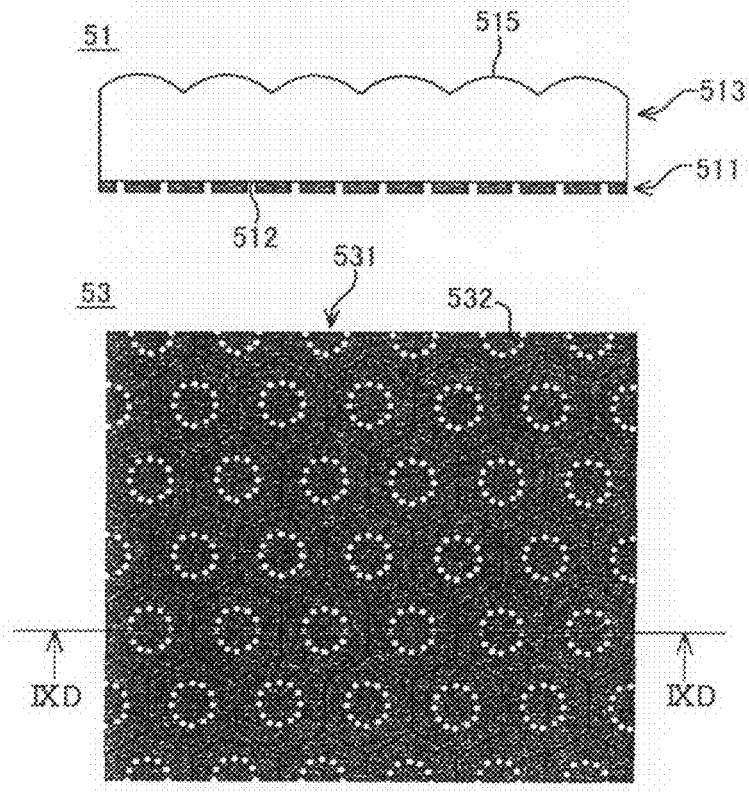
*Fig. 9C*
*Fig. 9D*
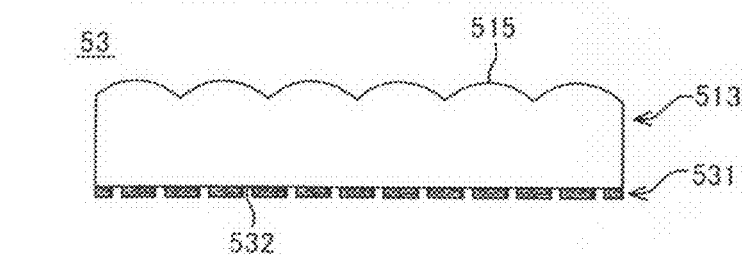

RELATED ART

METHOD FOR LIGHTING APPARATUS AND DISPLAY APPARATUS

This is a Division of application Ser. No. 11/455,807 filed Jun. 20, 2006 now U.S. Pat. No. 7,396,150. The disclosure of the prior application is hereby incorporated by reference herein in its entirety.

BACKGROUND OF THE INVENTION

1. Field of the Invention

The present invention relates to lighting apparatus and display apparatus using the same.

2. Description of Related Art

In display, optical communication and many other fields, there is a demand for alignment of relatively diverging light beams in a given direction. To meet this demand, lighting apparatus are generally provided with an optical sheet for controlling the directivity of light in a light exit port of a light source housing. The optical sheet is optically transparent and aligns incident light in a given direction. A typical example of such an optically transparent optical sheet for controlling the directivity of light is a prism sheet as disclosed in Japanese Unexamined Patent Application Publication No. 2004-281270, for example.

A normal prism sheet is formed of multiple triangular or half-barrel shaped prisms which control the direction of light beams by prism effects or lens effects. However, whatever shape the prisms of the prism sheets take, there is a limit to the control of the directivity of light as long as light beams enter the prism sheet from all angles. For example, when a lighting apparatus is used as a backlight of a liquid crystal display, a light focus angle is about ±30 degrees at smallest with respect to the normal to a liquid crystal surface, and it is difficult to focus light within a desired angle range. It is also difficult to increase the front luminance of a liquid crystal surface to double or higher.

A lighting apparatus using another example of an optical sheet is disclosed in Japanese Unexamined Patent Application Publication No. H02-214287, for example. This lighting apparatus uses a lenticular lens sheet that has a reflector on its backside. The lenticular lens sheet is attached to a housing (light box) that contains a light source, and the inner surface of the housing is highly reflective. The reflector on the backside of the lenticular lens sheet has openings (slots) arrayed in stripes, through which light from the light source exits outside. The invention disclosed in Japanese Unexamined Patent Application Publication No. H02-214287 is applicable to a micro lens sheet, in which case the openings are arranged in dots.

Furthermore, because such a prism sheet is normally formed by molding, changing the optical characteristics of the sheet requires changing the shape of a mold. A mold is generally expensive, and changing its shape leads to an increase in manufacturing costs of the prism sheet. In addition, manufacturing a prism sheet by the molding takes time to reduce the manufacturing efficiently. It is therefore difficult to design the sheet that can control the direction of light as desired.

SUMMARY OF THE INVENTION

As described in the foregoing, the lighting apparatus of related arts have a problem that the light direction freedom of design is limited in order to avoid an increase in manufacturing costs and reduction in manufacturing efficiency.

The present invention has been accomplished to address the above concern, and an object of the present invention is thus to provide a lighting apparatus and a display apparatus that enables accurate control of light direction to emit highly directive light and permits broad freedom of design.

According to an aspect of the preset invention, there is provided a lighting apparatus including a light source that emits light, a housing that contains the light source inside and has an exit port for outputting light from the light source, and an optical sheet that is placed in the exit port. The optical sheet includes a lens structure that is placed at a light exit side and aligns an output direction of incident light from the light source, a reflector that is placed at a light incident side and reflects light emitted by the light source, and a light transmitting opening that exists in the reflector and transmits incident light from the light source, wherein the light transmitting opening is placed in a position deviated from an optical axis of the lens structure.

In this configuration, it is possible to change the direction of light output from the lens structure by changing the position of the light transmitting opening. The light can be thus aligned in a given direction, thereby achieving a lighting apparatus that emits highly directive light. Further, the direction of output light can be controlled simply by changing the position of the light transmitting opening, thereby increasing freedom of design.

In a preferred embodiment, the lens structure aligns the incident light in parallel with each other. Particularly, when the width of the opening is sufficiently narrow with respect to the lens pitch of the lens structure, the lens structure can align the incident light beams in parallel with each other.

The lens structure may include a plurality of lens portions, and the light transmitting opening may be formed in a position deviated from the optical axis of the lens structure by a distance shorter than an interval between the plurality of lens portions. Further, the light transmitting opening may be formed in stripe pattern extending along a longitudinal direction of the lenticular lens. Furthermore, the light transmitting opening may be in wave pattern about the optical axis of the lenticular lens. The light transmitting opening may have a plurality of opening portions linearly arranged along the optical axis of the lenticular lens.

Further, the lens portion may be a micro lens array, and the light transmitting opening may be scattered over the reflector.

The light transmitting opening placed in the position deviated from the optical axis may be a first light transmitting opening, and the optical sheet may include a second light transmitting opening different from the first light transmitting opening and formed on the optical axis of the lens structure. This enhances the directivity in the normal direction.

The lens structure may include a plurality of non-lens portions that are disposed between the plurality of lens portions and have smaller lens effects than the lens portions.

Preferably, the plurality of non-lens portions are flat surfaces parallel to a sheet plane of the optical sheet, and the plurality of lens portions are joined through a plurality of flat surfaces.

According to another aspect of the present invention, there is provided a lighting apparatus including a light source that emits light, a housing that contains the light source inside and has an exit port for outputting light from the light source, and an optical sheet that is placed in the exit port. The optical sheet includes a lens structure that aligns an output direction of incident light from the light source by a plurality of lens portions formed on a light exit side, a reflector that is placed at a light incident side and reflects light emitted by the light source, and a plurality of light transmitting openings that exist in the reflector and transmit incident light from the light source. The incident light from the light source enters at least one of the plurality of lens portions through the plurality of light transmitting openings.

In this configuration, it is possible to change the direction of light output from the lens structure by changing the position of the light transmitting opening. The light can be thus aligned in a given direction, thereby achieving a lighting apparatus that emits highly directive light. Further, the direction of output light can be controlled simply by changing the position of the light transmitting opening, thereby increasing freedom of design.

According to another aspect of the present invention, there is provided a display apparatus that includes the lighting apparatus as described above. With the use of the highly directive lighting apparatus, the display apparatus that enables accurate control of light direction to emit highly directive light and allows broad freedom of design can be produced.

Preferably, another aspect of the present invention is used as a backlight of a liquid crystal display apparatus. This enables accurate and easy viewing angle control, thereby achieving the display apparatus that enables more accurate control of light direction.

According to another aspect of the present invention, there is provided a method of manufacturing an optical sheet including a light focusing element formed on a first surface of an optically transparent base, a reflective film formed on a second surface of the base opposing to the first surface, and an opening formed in the second surface. The method includes forming a photosensitive resin layer on the second surface, applying parallel light through the first surface and focusing the light by the light focusing element, exposing selectively the photosensitive resin layer to the focused light, forming the opening in an exposed area, and forming the reflective film on a non-exposed area different from the exposed area.

In this method, the openings are self-aligned with the reflective films by the light focusing effects of the light focusing element. It is thereby possible to easily manufacture the optical sheet that enables accurate control of light direction to emit highly directive light and allows broad freedom of design.

In the method, the application of parallel light may apply a parallel light beam in an inclined direction with respect to a normal to the base. This easily increases the directivity of light in a given direction.

Further, the application of parallel light may apply a plurality of parallel light beams in a plurality of inclined directions. This enables more complicated control of the shape and size of the opening, thereby achieving higher optical properties.

In the above method, the application of parallel light may include placing a photomask having a light shielding pattern on the light focusing element, and applying the parallel light through the photomask. This enables more complicated control of the shape and size of the opening.

According to another aspect of the present invention, there is provided a method of manufacturing an optical sheet including a light focusing element formed on a first surface of an optically transparent base, a reflective film formed on a second surface of the base opposing to the first surface, and an opening formed in the second surface. The method includes forming an optically transparent photosensitive resin layer on the second surface, applying parallel light through the first surface and focusing the light by the light focusing element, exposing selectively the photosensitive resin layer to the focused light, forming the opening in an exposed area, pressing reflective particulates against the photosensitive resin layer in a non-exposed area different from the exposed area, and forming the reflective film by attaching the pressed reflective particulates to the non-exposed area.

In this method, the openings are self-aligned with the reflective films by the light focusing effects of the light focusing element. It is thereby possible to easily manufacture the optical sheet that enables accurate control of light direction to emit highly directive light and allows broad freedom of design.

According to another aspect of the present invention, there is provided a method of manufacturing an optical sheet including a light focusing element formed on a first surface of an optically transparent base, a reflective film formed on a second surface of the base opposing to the first surface, and an opening formed in the second surface. The method includes forming an optically transparent and water repellent photosensitive resin layer on the second surface, applying parallel light through the first surface and focusing the light by the light focusing element, exposing selectively the photosensitive resin layer to the focused light; removing the photosensitive resin layer in a non-exposed area different from an exposed area to expose the second surface, applying reflective particulates and solvent onto the exposed second surface, drying the applied reflective particulates and solvent to be attached to the exposed second surface to form a reflective film, and repelling the reflective particulates and solvent applied to the exposed area by the drying to form the opening in the exposed area.

In this method, the openings are self-aligned with the reflective films by the light focusing effects of the light focusing element. It is thereby possible to easily manufacture the optical sheet that enables accurate control of light direction to emit highly directive light and allows broad freedom of design.

According to another aspect of the present invention, there is provided a method of manufacturing an optical sheet including a light focusing element formed on a first surface of an optically transparent base, a reflective film formed on a second surface of the base opposing to the first surface, and an opening formed in the second surface. The method includes forming a photosensitive resin layer on the second surface, applying parallel light through the first surface and focusing the light by the light focusing element, exposing selectively the photosensitive resin layer to the focused light, removing the photosensitive resin layer in a non-exposed area different from an exposed area to expose the second surface, applying a thin metal film onto the exposed second surface to form the reflective film, removing the photosensitive resin layer in the exposed area and the thin metal film formed on the photosensitive resin layer to form the opening.

In this method, the openings are self-aligned with the reflective films by the light focusing effects of the light focusing element. It is thereby possible to easily manufacture the optical sheet that enables accurate control of light direction to emit highly directive light and allows broad freedom of design.

In the method, the application of parallel light may apply a parallel light beam in an inclined direction with respect to a normal to the base. This easily increases the directivity of light in a given direction.

Further, the application of parallel light may apply a plurality of parallel light beams in a plurality of inclined directions. This enables more complicated control of the shape and size of the opening, thereby achieving higher optical properties.

In the above method, the application of parallel light may include placing a photomask having a light shielding pattern on the light focusing element, and applying the parallel light through the photomask. This enables more complicated control of the shape and size of the opening.

According to another aspect of the present invention, there is provided a lighting apparatus including a light source that emits light, a housing that contains the light source inside, has an exit port for outputting light from the light source, and has an inner surface with reflection effects for reflecting light emitted by the light source, and an optical sheet that is placed in the exit port. The optical sheet includes a lens structure that is placed at a light exit side and aligns an output direction of incident light from the light source, a reflector that is placed at a light incident side and reflects visible light of 80% or higher, and a light transmitting opening that exists in the reflector and transmits incident light from the light source. The lens structure has a repetitive structure where a plurality of lens portions are arranged repeatedly, and a pitch P between the plurality of lens portions and a distance D from an end of the light transmitting opening to an intermediate position between the lens portions satisfy: P/D>2.4.

The optical sheet of an aspect of the preset invention is manufactured by this method. In this method, the openings are self-aligned with the reflective films by the light focusing effects of the light focusing element. It is thereby possible to easily manufacture the optical sheet that enables accurate control of light direction to emit highly directive light and allows broad freedom of design.

The present invention can provide a lighting apparatus and a display apparatus that enables accurate control of light direction to emit highly directive light and permits broad freedom of design.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIGS. 6A and 6B are views that schematically show an example of an optical sheet according to an embodiment of the present invention;

FIGS. 7A and 7B are views that schematically show an example of an optical sheet according to an embodiment of the present invention;

FIGS. 9A to 9D are views that schematically show an example of an optical sheet according to an embodiment of the present invention;

DESCRIPTION OF THE PREFERRED EMBODIMENTS

A lighting apparatus according to an embodiment of the present invention aligns incident light beams in a given direction by an optical structure. Exemplary embodiments of the present invention are described hereinafter with reference to the drawings.

First Embodiment

Figure 1A:
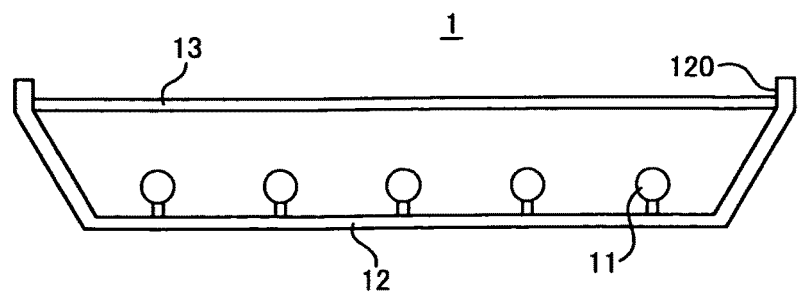
FIGS. 1A to 1C are views that schematically show exemplary structures of a lighting apparatus according to an embodiment of the present invention.

Overall structure of a lighting apparatus according to the present invention is described herein after with reference to FIG. 1A. FIG. 1A schematically illustrates an example of a lighting apparatus according to this invention. As shown in FIG. 1A, the lighting apparatus 1 includes a light source 11, a housing 12 and an optical sheet 13.

The light source 11 emits light of the lighting apparatus 1 and it may be a fluorescent tube, light emitting diode (LED) and so on.

The housing 12 has the light source 11 inside, and is provided with a light exit port 120 for outputting the light emitted by the light source 11 to the outside. The inner surface of the housing 12 is formed of a reflective plane that reflects the light from the light source 11 diffusely, and it may be covered with a reflective member such as titanium oxide, for example, so that the entire inner surface of the housing 12 substantially has reflecting properties. Preferably, over 90% of the housing inner surface is covered with a reflective member. The inner surface of the housing 12 may be formed as a reflective plane by mixing a material having reflecting properties into the inner surface of the housing 12. Material having high reflectance that reflects visible light at an average reflectance of about 80% may be used as the reflective member or material to be mixed in.

The optical sheet 13 is placed in the light exit port 120 of the housing 12. Specifically, the optical sheet 13 is fit to the light exit port 120 to close up the port. The optical sheet 13, together with the housing 12, thereby constitutes a structure where the light source 11 is placed inside. The optical sheet 13 preferably seals the housing 12 in order to prevent the light emitted by the light source 11 from leaking outside. This enhances the efficiency of using the light emitted by the light source 11.

Figure 1B:
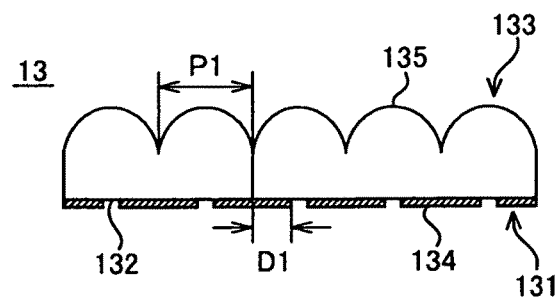

The optical sheet 13 of the lighting apparatus 1 according to an embodiment of the invention is described herein with reference to FIG. 1B. FIG. 1B schematically illustrates the side of the exemplary optical sheet 13. As shown in FIG. 1B, the optical sheet 13 includes a reflector 131, an opening 132, and a lens structure 133.

The reflector 131 is formed of a reflective member. The reflective member used therein may reflect visible light at an average reflectance of as high as about 80%, for example. The reflector 131 is placed on the light incident side of the optical sheet 13. Thus, the reflector 131 is placed on the side of the optical sheet 13 which faces the light source 11, that is the inner side of the housing 12. In other words, the reflector 131 is adhered to the backside (light incident surface) of the optical sheet 13.

The opening 132 is a light transmittance opening through which incident light enters the optical sheet 13, and it is in the reflector 131 on the backside of the optical sheet 13. The backside surface of the optical sheet 13 is exposed through the opening 132. The other part of the reflector 131, other than the opening 132, reflects incident light. In the structure where the opening 132 divides the reflector 131 into a plurality of portions, the reflector 131 is made up of a plurality of reflective portions 134.

The lens structure 133 is an example of a structure having optical properties (i.e. optical structure), which particularly has lens effects. The lens structure 133 is composed of a plurality of lens portions 135 which are joined in contact with each other. As illustrated in FIG. 1B, each lens portion 135 may be an elongated lenticular lens having a substantially half-barrel shaped cross-section. The lens portions 135 are joined with their longer sides in contact with each other and arranged in the direction of the shorter side (the horizontal direction on the drawing), so that the V-shape parts between the lens portions 135 are deeply notched.

The lens structure 133 is formed in the optical sheet 13 on the side that outputs light beams so as to change the direction of incident light. The lens structure 133 collimates incident light so that the incident light directs in a direction perpendicular to a principal surface of the optical sheet 13, which is refereed to herein also as the optical sheet plane; i.e. normal to the optical sheet plane. Therefore, the opening 132 through which the light from the light source 11 enters is formed in the vicinity of the optical axis of each lens portion 135 of the lens structure 133. The thickness of the lens structure 133 is set so that the focal position of the lens portion 135 is in the vicinity of the opening 132 on the backside of the optical sheet.

If the lens portion 135 is an elongated lenticular lens, its optical axis extends along the longitudinal direction of the lens portion 135. Therefore, the openings 132 are arranged in stripes to divide the reflector 131 into a plurality of reflective portions 134. Thus, each space between the reflective portions 134 that are placed with a certain space from each other serves as the opening 132.

The way that the lighting apparatus 1 of this embodiment outputs light is described hereinbelow with reference to FIGS. 1A to 1C.

The light emitted by the light source 11 enters the lens structure 133 through the openings 132 of the optical sheet 13. The light incident on the part other than the opening 132 is reflected by the inner surface of the housing 12 as a reflective plane or the reflector 131 of the optical sheet 13. The light is reflected repeatedly until it eventually reaches the opening 132. The light then passes through the opening 132 to enter the lens structure 133. In this way, the direction of incident light is aligned in a given direction (the direction perpendicular to the optical sheet plane) by the optical properties of the lens structure 133.

As described above, in the lighting apparatus 1 of this embodiment, the optical sheet 13 inside the housing 12 has reflective properties except for the opening 132. Therefore, the light emitted by the light source 11 is reflected diffusely inside the housing 12 and finally output through the opening 132 of the optical sheet 13. Particularly, the inner surface of the housing 12 substantially forms the reflective plane, and the reflector 131 of the optical sheet 13 reflects 80% or more of visible light. The amount of light absorbed inside the housing 12 is thereby reduced, thus the loss of light can be suppressed. This increases the amount of output light beams, thereby the efficiency of using the light emitted by the light source 11 can be increased.

Further, because the light output from the lens structure 133 is parallel light, the luminance in the direction perpendicular to the optical sheet increases. This improves the directivity of light in the direction perpendicular to the optical sheet plane. The lighting apparatus 1 capable of accurate control of light direction may be used for a mobile phone terminal, a backlight of ATM display, and so on. If it is used as a display backlight, it contributes to preventing the display from being peered through and enhancing the confidentiality of information.

Though a single optical sheet 13 is placed in the optical exit port 120 in the above-described embodiment, the present invention is not limited thereto. For example, other optical sheets may be used, such as a commercially available diffusion plate placed on the light incident side of the optical sheet 13, a scattering sheet placed on the light exit side of the optical sheet 13, and so on. The inner surface of the housing 12 and the surface of the optical sheet 13 described above refer to optical surfaces, including the surfaces having a reflective member covered with a transparent protective film or the like.

Figure 22:
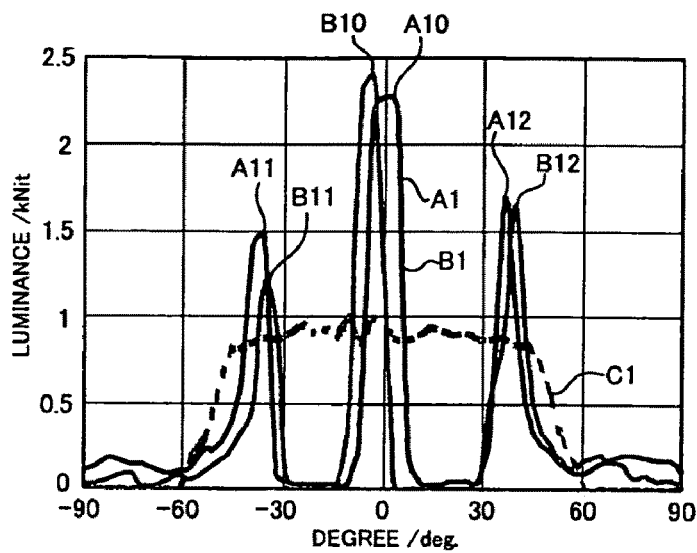
FIG. 22 is a graph that shows an example of luminance characteristics of a lighting apparatus according to an embodiment of the present invention.

The relationship between the pitch P1 of the lens portions 135 and the distance D1 from the end of the lens portion 135 to the end of the reflective portion 134 of the reflector 131 is described herein with reference to FIG. 1B. As described above, the opening 132 of the optical sheet 13 is placed in the vicinity of the focal point of the lens structure 133. The relationship is described by referring also to the graph of FIG. 22 which shows the luminance distribution of the optical sheet 13. In the graph of FIG. 22, the measurement A indicates measurement results in Example 1 described later.

In the measurement A shown in the graph of FIG. 22, there are sub-peaks A11 and A12 in addition to a main peak A10 which is in the direction perpendicular (normal) to the optical sheet plane. This is because of the following reasons. In the optical sheet 13, each opening 132 is formed in the vicinity of each optical axis of the lens structure 133. Accordingly, the incoming light thorough the opening 132 enters not only a given lens portion 135 but also the adjacent lens portions 135. Therefore, the light beams are aligned also in the direction different from the normal to the optical sheet plane, which are emerged as the sub-peaks A11 and A12. In order to reduce the sub-peaks, the relationship between the pitch P of the lens portions 135 of the lens structure 133 and the distance D from the end of the optically transparent opening 132 to the end of the lens portion 135 needs to satisfy the condition of P/D<2.4.

Figure 1C:
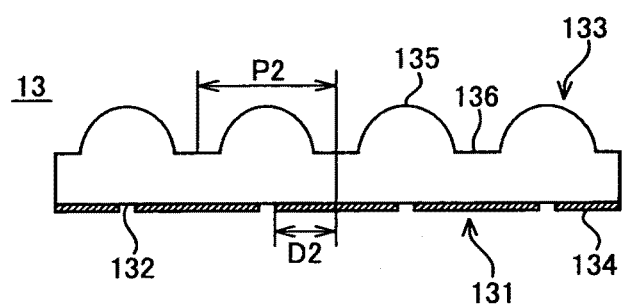
Figure 24:
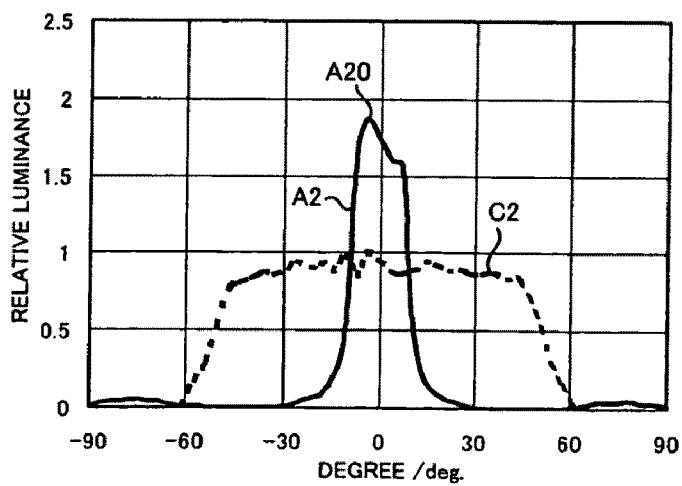
FIG. 24 is a graph that shows an example of luminance characteristics of a lighting apparatus according to an embodiment of the present invention.

Because it is difficult to form the lens portions continuously when producing the optical sheet in practice, a flat portion 136 may be formed between the lens portions in some cases as shown in FIG. 1C. In such a case, the condition of P/D<2.4 needs to be satisfied using the intermediate position between the adjacent lens portions as a standard. In this case, there is the side benefit that the sub-peaks can be reduced or eliminated. Specifically, the use of the optical sheet 33 having the flat portions allows the luminance peak to occur only at the main peak A20 in the normal direction as shown in FIG. 24.

Second Embodiment

Figure 2A:
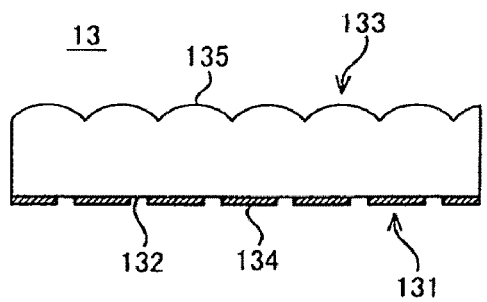
FIGS. 2A to 2D are side views that schematically show examples of an optical sheet according to an embodiment of the present invention.

In the first exemplary embodiment described above, the opening 132 is formed in the vicinity of the optical axis of the lens portion 135 as shown in FIG. 2A to align the optical axes of incident light beams in the normal direction to the optical sheet plane. On the other hand, in a second exemplary embodiment of the present invention, the opening is formed in a position that is slightly off the optical axis of the lens portion 135. In this case, the light beams output from the optical sheet 13 can be aligned in the direction slightly deviated from the normal to the optical sheet plane.

Figure 2B:
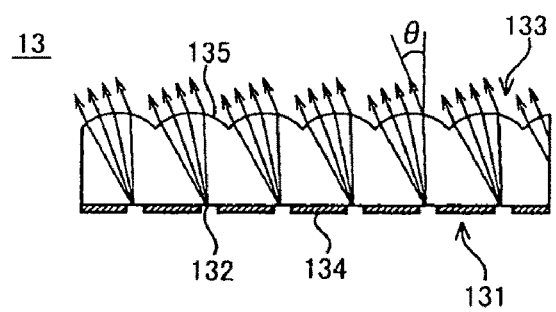

The direction of incoming light beams is aligned in a given direction by the optical properties of the lens structure 133. Specifically, as shown in FIG. 2B, the light beam is output from the lens portion 135 in a direction inclined with respect to the optical sheet plane in accordance with a degree of deviation of the opening 132 from the optical axis. Thus, the angle of inclination θ between the output light and the optical sheet plane is determined according to the distance of the opening 132 from the optical axis. The light beams output from the optical sheet 13 can be thereby aligned in the direction deviated the direction perpendicular to the optical sheet plane.

As described above, in the lighting apparatus 1 of this embodiment, the opening 132 of the optical sheet 13 is formed in the position that is slightly deviated from the optical axis of the lens portion 135. It is possible to align the output light beams from the lens portion 135 in the direction deviated from the normal to the optical sheet plane by adjusting the position of deviation accordingly. The directivity of the light from the lighting apparatus 1 can be thereby easily enhanced, thus freedom of design can be broadened. It is thereby able to change the direction of aligning the output light beams easily according to the usage of the light apparatus 1, such as the usage that requires restriction of a viewing angle in a liquid crystal display apparatus, for example.

The measurement B in the graph of FIG. 22 indicates the luminance distribution in the optical sheet 13 when the opening 132 is slightly off the optical axis. As shown therein, the main peak B10 appears in the position slightly deviated from the substantially normal (at angle 0°) to the optical sheet plane. Thus, the light beams are aligned in the direction slightly deviated from the direction perpendicular to the optical sheet plane in this case. Like the measurement A, the measurement B also has the sub-peaks B11 and B12 in addition to the main peak B10.

Third Embodiment

A third exemplary embodiment of the present invention describes another example of optical sheet. The optical sheet of this embodiment has a lens structure having a shape different from the shape of the lens structure of the first embodiment in such a way that the spaces between the lens portions are widened.

Figure 2C:
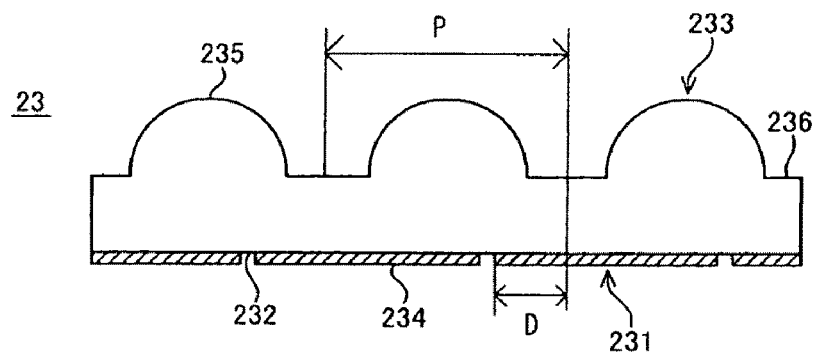
Figure 2D:
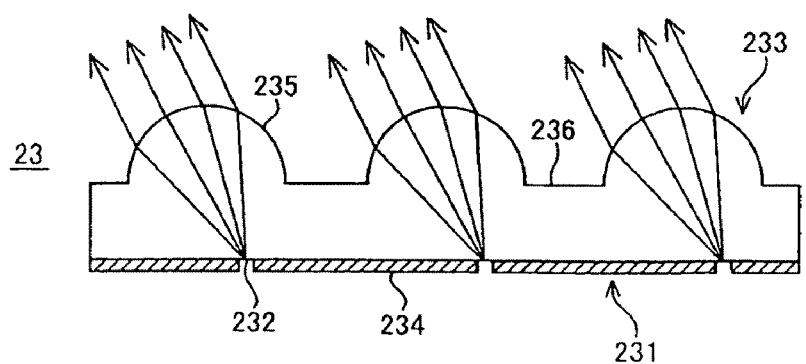

The structure of the optical sheet according to this embodiment is described hereinafter in detail with reference to FIGS. 2C and 2D. FIGS. 2C and 2D are side views that schematically illustrate the optical sheet according to this embodiment.

As shown in FIG. 2C, the lens structure 233 of the optical sheet 23 of this embodiment has a plurality of flat portions 236 in addition to a plurality of lens portions 235. The flat portions 236 are exemplary non-lens portions that do not substantially have lens effects unlike the lens portions 235. The flat portions 236 form a reflective plane that totally reflects the incident light on the optical sheet 23. Thus, the flat portions 236 prevent the incident light from exiting. The flat portions 236 are placed between the lens portions 235 to join them.

The non-lens portion includes not only the part that has no lens effect but also the part that has small lens effects and outputs a negligible amount of light. Thus, the flat portions 236 may be flat or substantially flat planes having no or small lens effects, including the plane that can be generally perceived as flat in spite of slight lens effects.

Referring to FIG. 2C, the lens pitch in the lens structure 233 of the optical sheet 23 of the third embodiment is larger than the lens pitch in the lens structure 133 of the optical sheet 13 of the first embodiment shown in FIG. 2A. Accordingly, the distance between the ends in the optical sheet 23 is larger than that in the optical sheet 13. On the other hand, the widths of the openings 132 and 232 of the optical sheets 13 and 23, which are the intervals of the reflective portions 134 and 234, are respectively the same.

Here, the term "the distance between the ends in the optical sheet 13" is a distance from the end of the lens portion 135 to the end of the reflective portion 134 or a distance from the end of the lens portion 135 to the boundary between the reflective portion 134 and the opening 132. Similarly, the term "the distance between the ends in the optical sheet 23" is a distance from the end of the lens portion 235 to the end of the reflective portion 234.

As described above, the distance between the ends in the optical sheet 23 is larger than that in the optical sheet 13. Specifically, the lens pitch of the lens structure 233 is set larger than the lens pitch of the lens structure 133 while the width of the opening 232 remains the same as the width of the opening 132. This increases the interval between the lens portions 235. Thus, in the optical sheet 23, the light entering through the given opening 232 reaches the flat portion 236 and is reflected by this, and does not enter the next lens portion 235. In this way, the flat portion 236 between the lens portions 235 prevents the light from outputting through the outside of each lens portion 235. It is thereby possible to align the light beams only in the direction at a tilted angle with respect to the optical sheet 23 to enhance the directivity of light in this tilted direction, which is suitable for use in the application that requires restriction of a viewing angle.

Further, the optical sheet 23 of this embodiment is compatible with micro lenses. In the optical sheet 13 of the second embodiment, the lens pitch between the lens portions 135 can be for example, widened by changing the shapes of the lens portions 135. This prevents the light from entering the lens portion 135 adjacent to the given lens portion 135. If the lens shape is relatively large, the above concern is addressed by increasing the lens pitch and widening the interval of the reflective portions 234. However, if the lens shape is small, it is not easy to increase the distance between the ends due to manufacturing difficulty.

Specifically, if the lens pitch of the lens portions 135 that are arranged in contact with each other as shown in FIG. 2A is enlarged with respect to the distance between the ends, the lens portions 135 contact with each other at a sharp angle. When manufacturing such lens portions 135 by machining, the sharp portion is easily distorted. Thus, the manufacturing is difficult if the lens is small. This is the same when manufacturing the lens portions by using light beams such as laser, and it is difficult to manufacture the sharp portion.

As described, the technique of increasing the lens pitch by changing the lens shape fails to be compatible with smaller lenses. On the other hand, the optical sheet 23 of the third embodiment increases the lens pitch with respect to the distance between the ends and also widens the angle at the points of contact of the flat portion 236 and the lens portion 235 to avoid sharp angle. It is thereby able to manufacture the lens structure 233 having micro lenses. The optical sheet 23 of the third embodiment therefore enhances the directivity of light and is also compatible with micro lens structure.

Fourth Embodiment

A fourth exemplary embodiment of the present invention describes another example of the optical sheet. The optical sheet of this embodiment is different from the optical sheet 23 of the third embodiment in the shape of the opening 232.

Figure 3:
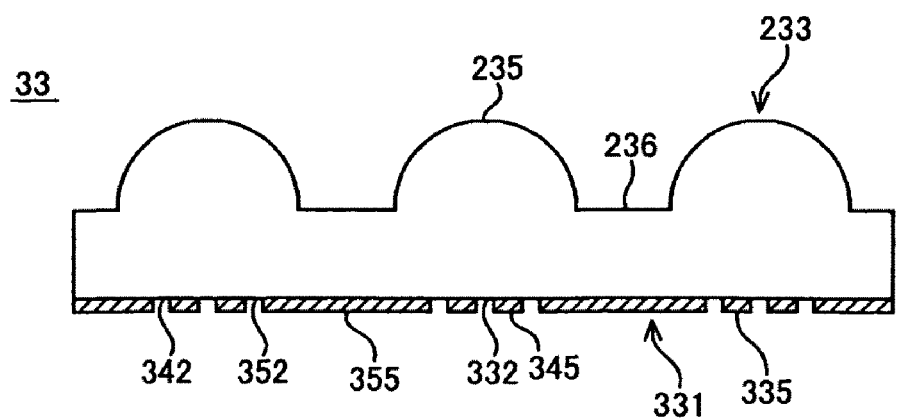
FIG. 3 is a view that schematically shows an example of an optical sheet according to an embodiment of the present invention.

The structure of the optical sheet according to this embodiment is described hereinafter in detail with reference to FIG. 3. FIG. 3 is a side view that schematically illustrates the optical sheet of this embodiment.

As shown in FIG. 3, the optical sheet 33 of the fourth embodiment has openings 332, 342 and 352 which extend along the longitudinal direction of the lens. Specifically, the opening 332 is placed on the optical axis of the lens portion 235, and the openings 342 and 352 are respectively placed on both sides of the opening 332, slightly deviated from the opening 332 in the direction along the shorter side of the lens.

In the optical sheet 33 of this embodiment, the reflector 331 has a plurality of types of reflective portions 335, 345 and 355. The reflective portions 335, 345 and 355 are divided by the openings 342 and 352. Specifically, the reflective portions 335 is placed between the openings 332 and 342, and the reflective portions 345 is placed between the openings 332 and 352. The reflective portion 355 is placed between the opening 352 and the opening 342 in the adjacent lens portion 235. In FIG. 3, the opening 352 is placed in the corresponding position to the opening 232 in the optical sheet 23 of the third embodiment.

In this way, the optical sheet 33 of this embodiment has three openings 332, 342 and 352 which are arranged repeatedly in the direction of the shorter side of the lens. The luminance characteristics of the lighting apparatus 1 are a sum of the luminance characteristics of the openings 332, 342 and 352. Specifically, because the opening 332 is placed on the optical axis of the lens portion 235, the light entering through the opening 332 is output as the light that is highly directive in the direction perpendicular to the optical sheet plane. The light entering through the opening 352 is output from the lens portion 235 as the light that is highly directive in the direction inclined with respect to the optical sheet plane. The light entering through the opening 342 is output from the lens portion 235 as the light that is highly directive in the direction inclined with respect to the optical sheet plane axisymmetrically to the output light through the opening 352 about the optical axis. The openings 332, 342 and 352 respectively enable an increase in luminance in the normal direction and the directions inclined to left and right sides with respect to the normal in the lighting apparatus 1. Therefore, by changing the positions of the openings 332, 342 and 352, the luminance from the normal to a direction at a given angle in the lighting apparatus 1 can be increased, which enables easy change of the direction of the high directivity of light.

Fifth Embodiment

In the optical sheets 13, 23 and 33 in the first to fourth embodiments, the openings are formed in stripes from the top-plan view. However, the shape of the opening is not limited thereto. Other shapes of the opening in the optical sheet are described hereinafter in detail with reference to FIGS. 4A to 8F.

Figure 4A:
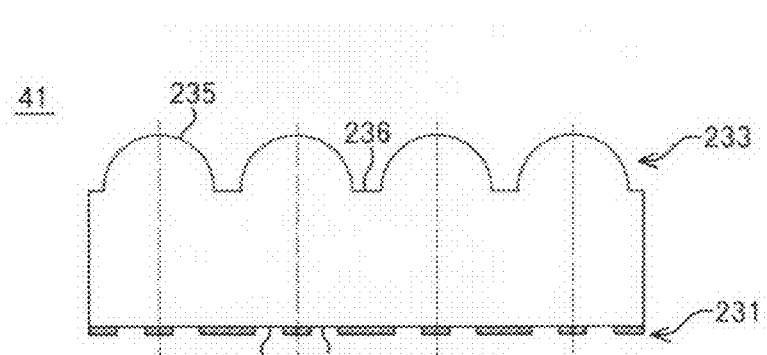
FIGS. 4A and 4B are views that schematically show an example of an optical sheet according to an embodiment of the present invention.
Figure 4B:
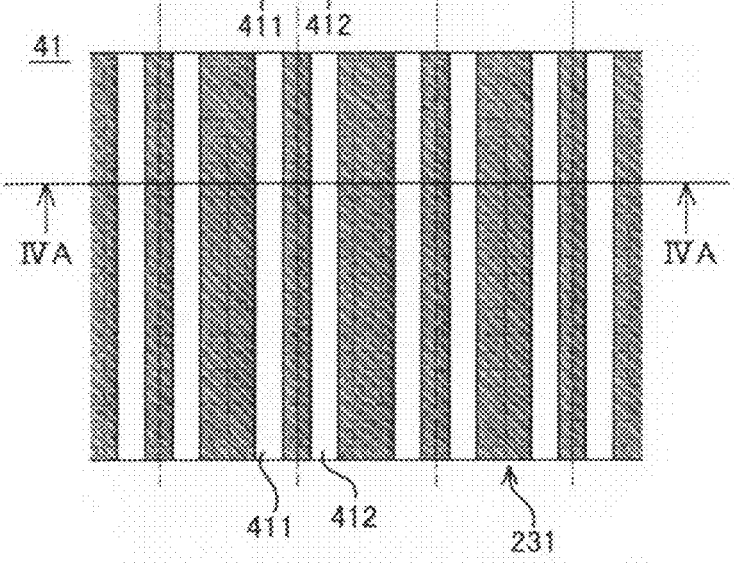

FIGS. 4A and 4B show an exemplary optical sheet according to this embodiment. FIG. 4A is a cross-sectional view along line IVA-IVA of FIG. 4B, and FIG. 4B is a top plan view. Though the optical sheet in FIGS. 4A and 4B uses the lens structure 233 used in the optical sheet 23, it may use the lens structure 133 used in the optical sheet 13.

Though three lines of the openings 332, 342 and 352 are repeatedly arranged in the optical sheet 33 of the fourth embodiment, two lines of the openings 411 and 412 may be repeatedly arranged in the optical sheet 41 as shown in FIGS. 4A and 4B. Specifically, this embodiment eliminates the opening 332 that is placed on the optical axis of the lens portion 235 in the optical sheet 33 of the fourth embodiment. Thus, the two lines of the openings 411 and 412 are placed in the positions off the optical axis of the lens portion 235. The openings 411 and 412 are placed in the corresponding positions to the openings 342 and 352 in the optical sheet 33 of the fourth embodiment.

If the optical sheet has two lines of the openings 411 and 412, it is possible to easily increase the luminance in the directions deviated from the normal of the lighting apparatus 1 to left and right at a given angle when viewed from the front of the lighting apparatus 1. The light entering from the openings 411 and 412 passes through the lens portion 235 and interferes in the direction normal to the lighting apparatus 1, and therefore the luminance in the normal direction can be enhanced. The optical sheet 41 is thus able to limit the viewing angle in the directions deviated from the normal to the lighting apparatus 1 to left and right at a given angle and to increase the luminance of peripheral part thereof particularly.

Figure 5A:
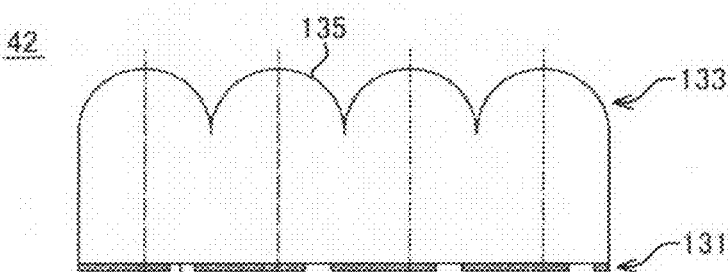
FIGS. 5A and 5B are views that schematically show an example of an optical sheet according to an embodiment of the present invention.
Figure 5B:
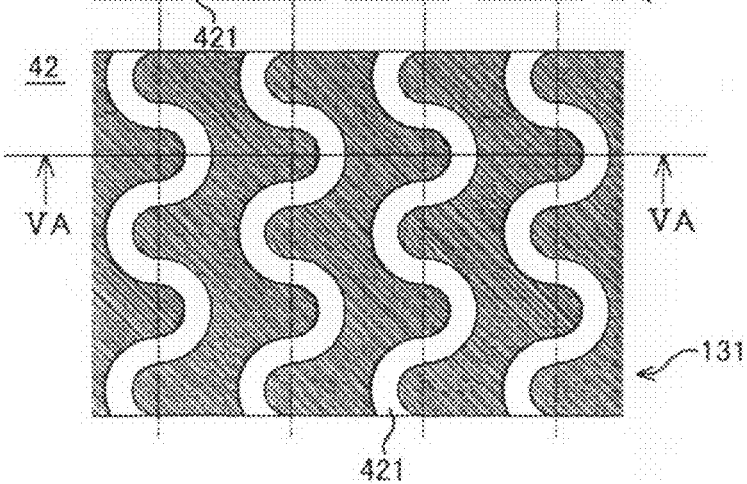

FIGS. 5A and 5B show an exemplary optical sheet according to this embodiment. FIG. 5A is a cross-sectional view along line VA-VA of FIG. 5B, and FIG. 5B is a top plan view. Though the optical sheet in FIGS. 5A and 5B uses the lens structure 133 used in the optical sheet 13, it may use the lens structure 233 used in the optical sheet 23.

As shown in FIG. 5B, the opening 421 of the optical sheet 42 is wave shape that curves left and right in the direction of the shorter side of the lens. Each opening 421 is such that S-shapes are linked repeatedly along the longitudinal direction of the lens. Specifically, each opening 421 curves left and right to be deviated alternately from the optical axis. Thus, the opening 421 is placed partly in the position on the optical axis of the lens portion 135 and partly in the position off the optical axis.

In the optical sheet 42, the luminance characteristics of output light are distributed wave-like in the longitudinal direction of the lens according to the shape of the opening 421. Specifically, The luminance of output light is high in the direction deviated to right at a certain angle from the normal. And it is high in the normal direction according to the position of the opening 421 from the part farthest from the optical axis to right to the part placed on the optical axis. These states of the luminance of output light continuously change, and furthermore continuously do like this from the part placed on the optical axis of the opening 421 to the part farthest from the optical axis to left. It is high in the normal direction and in the direction deviated to left at a certain angle from the normal. Thus, the luminance of output light changes gradually along the longitudinal direction of the lens. In particular, it is high in the direction deviated to right at a certain angle, in the normal direction, and in the direction deviated to left at a certain angle.

In this way, by changing the shape of the opening 421 from the top-plan view, it is possible to easily change the luminance of output light. Further, because the luminance characteristics of entire output light are a sum of the wave-like luminance characteristics in the longitudinal direction of the lens, it is possible to easily increase the luminance in the directions deviated to left and right from the normal of the lighting apparatus 1. The same advantages as in the optical sheet 41 shown in FIGS. 4A and 4B can be thereby obtained.

FIGS. 6A and 6B show an exemplary optical sheet according to this embodiment. FIG. 6A is a cross-sectional view along line VIA-VIA of FIG. 6B, and FIG. 6B is a top plan view. Though the optical sheet in FIGS. 6A and 6B uses the lens structure 233 used in the optical sheet 23, it may use the lens structure 133 used in the optical sheet 13.

Though the opening 421 of the optical sheet 42 has a smooth wave form, the opening 431 of the optical sheet 43 has an angular wave form. Thus, the opening 431 has stepped raised and recessed pattern to left and right. Specifically, the shape of the openings 431 has plurality of parts continuously joined each other, two of which projecting toward left and right alternately along the lens longitudinal direction are joined to the linear one arranged stripe-like along the optical axis of the lens portion 235. In other words, the opening 431 has the shape that rectangular openings are joined alternatively to both sides of the linear opening along the optical axis of the lens portion 235. Thus, the opening 431 is placed partly in the position on the optical axis of the lens portion 235 and partly in the position off the optical axis.

In the optical sheet 43, the luminance characteristics of output light are distributed in step pattern along the longitudinal direction of the lens according to the shape of the opening 431. Thus, the luminance of output light changes gradually along the longitudinal direction of the lens. In particular, it is high in the direction deviated to right at a certain angle from the normal, in the normal direction, and in the direction deviated to left at a certain angle from the normal.

In this way, by changing the shape of the opening 431 from the top-plan view, it is possible to easily change the luminance of output light. Further, because the luminance characteristics of entire output light are a sum of the step-like luminance characteristics in the longitudinal direction of the lens, it is possible to easily increase the luminance in the directions deviated to left and right from the normal to the lighting apparatus 1. The same advantages as in the optical sheet 42 shown in FIGS. 4A and 4B can be thereby obtained.

FIGS. 7A and 7B show an exemplary optical sheet according to this embodiment. FIG. 7A is a cross-sectional view along line VIIA-VIIA of FIG. 7B, and FIG. 7B is a top plan view. Though the optical sheet in FIGS. 7A and 7B uses the lens structure 233 used in the optical sheet 23, it may use the lens structure 133 used in the optical sheet 13.

The shape of the openings 441 in the optical sheet 44 is such that the part of the opening located on the optical axis of the lens portion 235 is eliminated from the opening 431 in the optical sheet 43. Specifically, a plurality of openings 441 are placed in stagger-like pattern on both sides of the optical axis of the lens portion 235. The rectangular openings 441 are arranged alternately on both sides along the longitudinal direction of the lens. Thus, the openings 441 are placed in the positions off the optical axis of the lens portion 235 along the longitudinal direction of the lens.

In the optical sheet 44, like the optical sheet 43, the luminance characteristics of output light distributes in step pattern along the longitudinal direction of the lens according to the shape of the opening 441. Thus, the luminance of output light changes gradually along the longitudinal direction of the lens. In particular, it is high in the direction deviated to right at a certain angle from the normal, in the normal direction, and in the direction deviated to left at a certain angle from the normal through the state that it is high. The same advantages as in the optical sheet 42 can be thereby obtained.

Sixth Embodiment

Though the lens portions according to the first to fifth embodiments are elongated lenticular lens, they may be micro lenses. In a sixth exemplary embodiment of the present invention, the lens portion 135 of the optical sheet 13 in the first embodiment is formed of a micro lens.

Figure 8A:
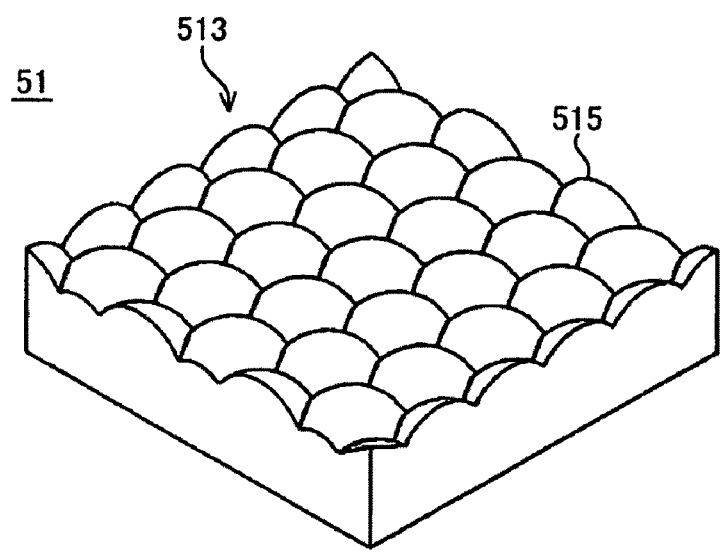
FIGS. 8A to 8F are views that schematically show an example of an optical sheet according to an embodiment of the present invention.
Figure 8B:
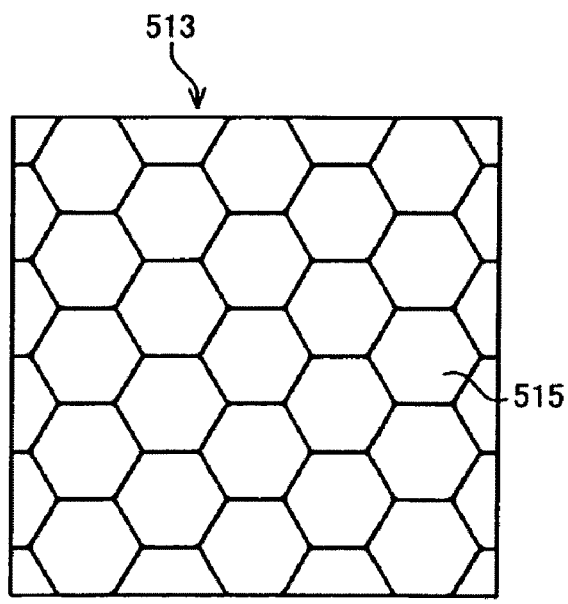
Figure 8C:
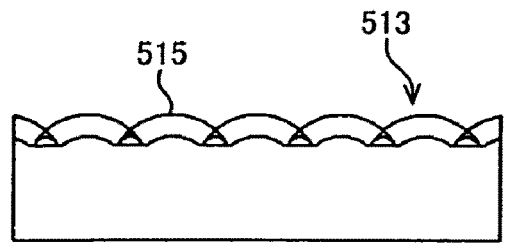

FIGS. 8A to 8F illustrate examples of the lens structure 513 in the optical sheet according to this embodiment. FIGS. 8A to 8C are a perspective view, a top plan view, and a side view of the lens structure 513, respectively. As shown therein, the lens structure 513 of the optical sheet 51 has a plurality of lens portions 515 that are arranged in matrix. The optical sheet 51 is a micro lens array sheet where the plurality of lens portions 515 are formed of a micro lens array. The plurality of lens portions 515 are joined in direct contact with each other, so that the V-shaped parts between the lens portions 515 are deeply notched.

Figure 8D:
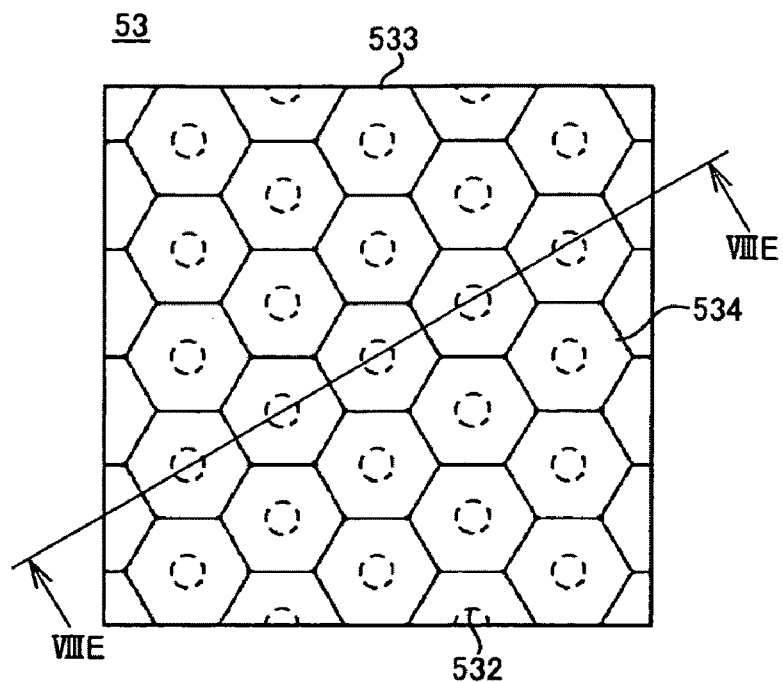
Figure 8E:
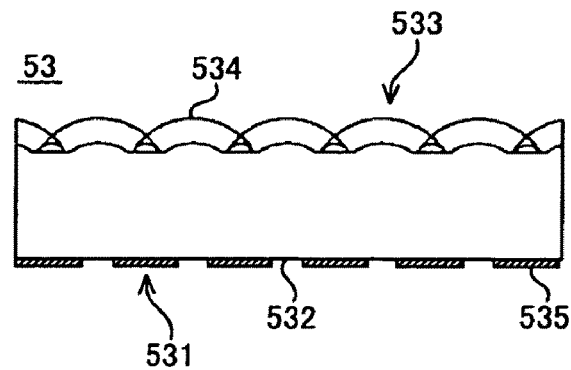
Figure 8F:
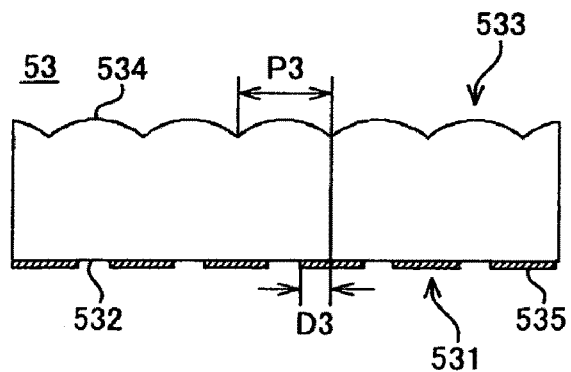

FIGS. 8D and 8E are a top plan view and a side view of the optical sheet 53, and FIG. 8F is a sectional view along line VIIIE-VIIIE in FIG. 8D. As shown therein, the reflector 531 is integrally formed on the backside of the optical sheet 53. A plurality of openings 532 in the optical sheet 53 are formed in the vicinity of the optical axis of the lens portions 535 formed of micro lenses. Thus, the plurality of openings 532 are scattered over the optical sheet 53 in matrix. Therefore, through the reflector 131 in the above-embodiments is formed of a plurality of lens portions 135, the reflector 533 in this embodiment is formed in an integral piece. In other words, the reflector 533 in this embodiment is composed of a single reflective portion 535.

In FIG. 8F, the lens pitch of the plurality of lens portions 535 in the optical sheet 53 is indicated by P3, and the distance between the ends is indicated by D3. Just like the embodiment that uses lenticular lenses, a sub-peak can be reduced or eliminated if the relationship of P/D<2.4 is satisfied.

In this way, it is possible to form the opening 532 and the reflector 534 on the backside of the optical sheet 53 formed of a micro lens array sheet. The same advantages as in the first embodiment can be obtained in this case.

Seventh Embodiment

In a seventh exemplary embodiment of the present invention, the openings 533 of the sixth embodiment are arranged not on the optical axes. FIGS. 9A and 9B illustrate the optical sheet 51 that is formed of a micro lens array sheet. FIG. 9A is a top plan view and FIG. 9B is a sectional view along line IXA-IXA of FIG. 9A. As shown therein, the reflector 511 of the optical sheet 51 is integrally formed on the backside of the optical sheet 51.

In the optical sheet 51, a plurality of openings 512 are formed in the vicinity of the optical axis of the lens portion 515, which is a micro lens. The plurality of openings 512 are thus scattered in matrix. Therefore, through the reflector 131 in the first embodiment is formed of a plurality of lens portions 135, the reflector 511 in this embodiment is formed in an integral piece. In other words, the reflector 511 in this embodiment is formed of a single reflective portion 511. Further, as shown in FIG. 9A, each opening is torus-shaped from the top-plan view. Accordingly, in the cross section, the reflector 511 is placed to interleave the optical axis as shown in FIG. 9B, just like the first embodiment.

FIGS. 9C and 9D illustrate the optical sheet 52 formed of a micro lens sheet, which has openings of another shape. FIG. 9C is a top plan view and FIG. 9D is a sectional view along line IXD-IXD of FIG. 9C. In the optical sheet 53 shown in FIGS. 9C and 9D, the opening 532 is such that the above opening 512 is composed of a plurality of discontinuous openings, so that each torus-shaped opening 512 is divided into dots.

In this way, it is possible to form the opening 512 and the reflector 511 on the backside of the optical sheet 51 formed of a micro lens array sheet. The same advantages as in the first embodiment can be obtained in this case.

Eighth Embodiment

Figure 10:
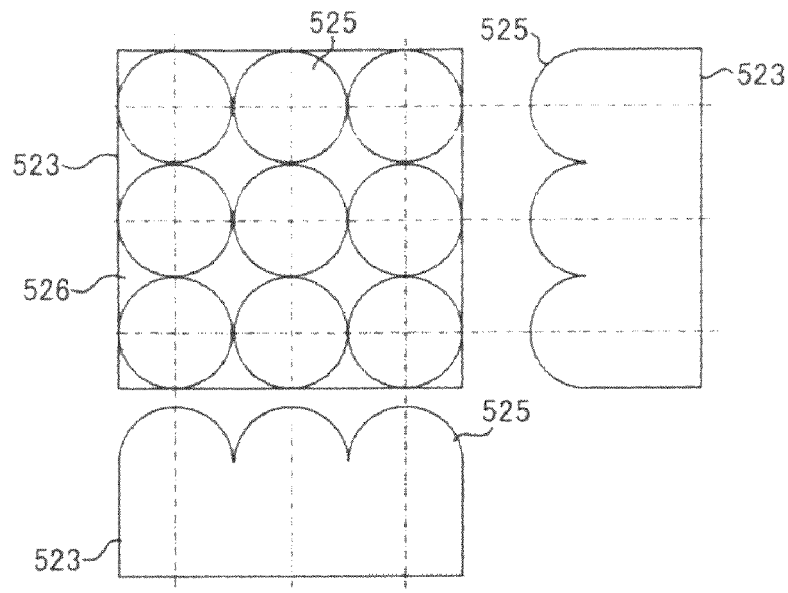
FIG. 10 is a view that schematically shows an example of an optical sheet according to an embodiment of the present invention.

FIG. 10 shows the lens structure 523 in the optical sheet 52 according to an eighth exemplary embodiment of the present invention. FIG. 10 is a view showing the top, front, and side of the lens structure 523. As shown in FIG. 10, the lens structure 523 of the optical sheet 52 has a plurality of flat portions 526, which are exemplary non-lens portions, in addition to a plurality of lens portions 525, just like the second embodiment. Each flat portion 526 is placed between the lens portions 525 to join them.

Figure 11:
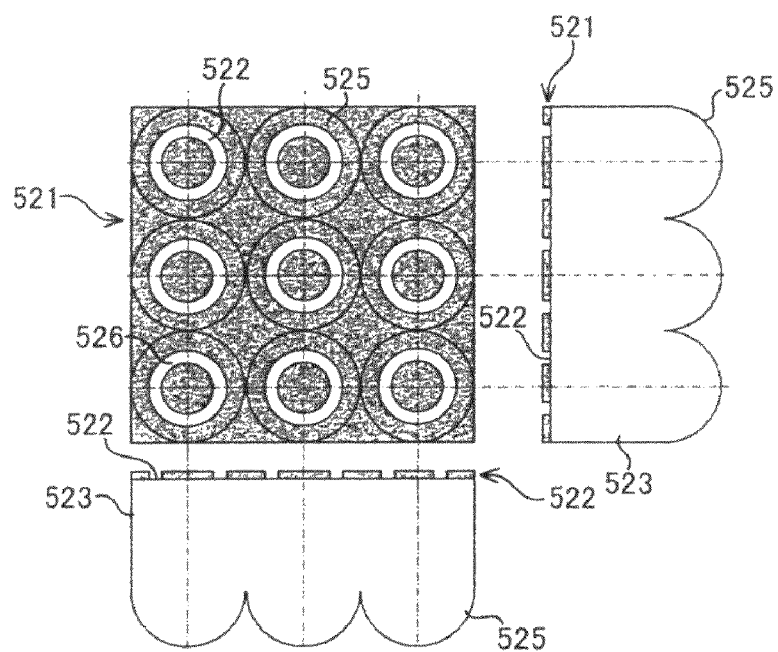
FIG. 11 is a view that schematically shows an example of an optical sheet according to an embodiment of the present invention.

FIG. 11 illustrates the optical sheet 52 which is a micro lens array sheet. FIG. 11 is a view showing the top, front, and side of the optical sheet 52. As shown in FIG. 11, in this embodiment also, the torus-shaped opening 522 is formed on the reflector 521 and placed in the vicinity of the focal point of the lends portion 525.

In this way, it is possible to form the opening 522 and the reflector 521 on the backside of the optical sheet 52, which is a micro lens array sheet, where the flat portion 526 is formed between the lens portions 525. The same advantages as in the second embodiment can be obtained in this case. The structure of this embodiment may be applied not only to the second embodiment but also to the third and fourth embodiment, which still produces the same advantages as in the second embodiment.

Though the lighting apparatus of the above-described embodiments has the structure that the housing and the optical sheet are physically separable, they may be integrated together. Thus, it is possible to place a plurality of lenses in the light exit port of a hollow housing that can contain a light source inside and further place a plurality of reflective portions and openings inside the housing in accordance with the positions of the plurality of lenses.

Ninth Embodiment

A method of manufacturing an optical sheet according to a ninth exemplary embodiment of the present invention is described hereinafter with reference to FIGS. 17A to 17D. FIGS. 17A to 17D schematically illustrate the process of manufacturing the optical sheet according to this embodiment Referring first to FIG. 17A, a photosensitive adhesive resin film 62 is formed on the backside of a base 61. The base 61 includes a body 610 and a light focusing element 611. The body 610 is a substrate on which the light focusing element 611 is formed and it may be a flat sheet, for example. The body 610 may be made of an optically transparent material, such as glass or synthetic resin formed of polymeric material such as polycarbonate, acrylic resin, polyethylene terephthalate (PET), polystyrene resin, silicone resin, and so on.

The light focusing element 611 may be a lenticular lens, which is an example of an optical structure, or may be another optical structure such as a micro lens or a prism. Thus, the base 61 may be a lenticular lens sheet, which is an example of an optical sheet, or may be another optical sheet such as a micro lens sheet or a prism sheet. The material of the light focusing element 611 may be the same as the material of the body 610. Alternatively, those materials may be different. For example, the light focusing element 611 may be formed by depositing a resin layer of ultraviolet curing resin or thermoplastic resin on the body 610 and transferring the pattern of a mold onto this resin layer.

The light focusing element 611 may be formed by various manufacturing methods including hot embossing, injection molding, and extrusion molding. The light focusing element 611 is optically designed so that parallel light applied from the front side of the base 61 is focused on the vicinity of the backside of the base 61.

The photosensitive adhesive resin film 62 may be an ultraviolet curing adhesive that is cured by ultraviolet light or a photosensitive adhesive that is cured by visible light. The photosensitive adhesive resin film 62 is formed on the backside of the base 61. Here, the backside of the base 61 is the flat surface of the body 610 on which the photosensitive adhesive resin film 62 is formed, and the front side of the base 61 is the surface of the body 610 on which the light focusing element 611 is formed. Thus, the backside of the base 61 is the surface opposite to the surface having the light focusing element 611.

Figure 17A:
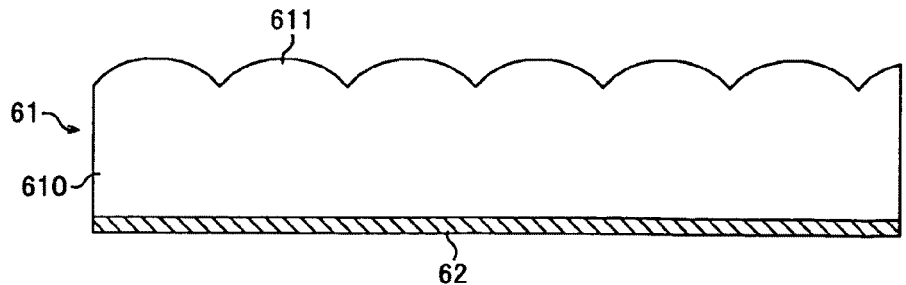
FIGS. 17A to 17D are cross-sectional views that schematically show a manufacturing process of an optical sheet according to a ninth embodiment of the present invention.
Figure 17B:
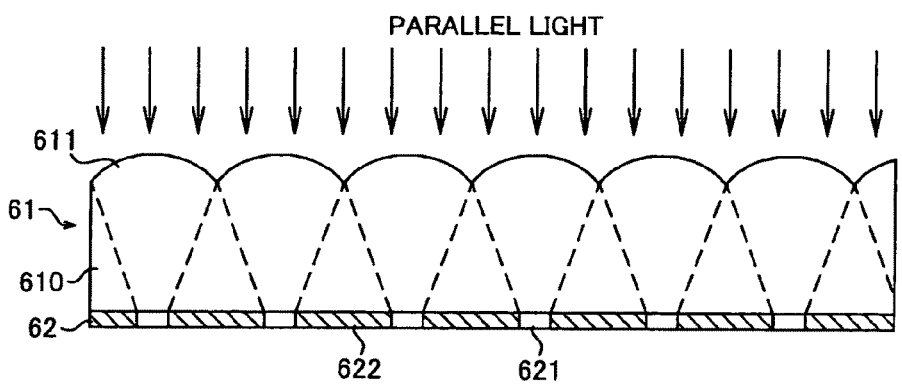

Referring then to FIG. 17B, ultraviolet light is applied from the front side of the base 61 to expose the photosensitive adhesive resin film 62. The ultraviolet light is parallel light and applied in the normal direction to the surface of the base 61. Thus, the ultraviolet light is applied in the optical axis direction of the light focusing element 611. Because the light focusing element 611 is formed on the surface of the base 61, the ultraviolet light is focused on the vicinity of the photosensitive adhesive resin film 62 by the light focusing element 611. The photosensitive adhesive resin film 62 in a focus area 621 is thereby cured while the photosensitive adhesive resin film 62 in a non-focus area 622 different from the focus area 621 remains uncured. Therefore, the photosensitive adhesive resin film 62 is formed of a cured area (focus area 621) and a non-cured area (non-focus area 622). The focus area 621 is located on the optical axis of the light focusing element 611 because the ultraviolet light is applied in the optical axis direction.

Figure 17C:
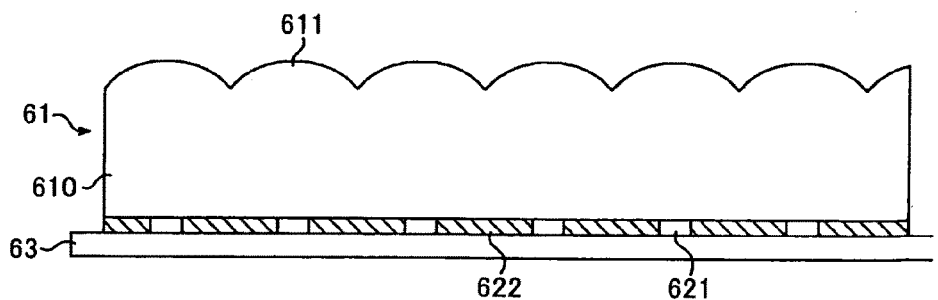

Referring then to FIG. 17C, reflective particulates 63 are pressed against the photosensitive adhesive resin film 62 that is partly cured. The reflective particulate 63 may be a highly reflective metal such as aluminum or silver, an alloy mainly composed of those metals, powder such as barium sulfate, calcium carbonate, magnesium oxide, highly refractive glass and so on. Though the shape or size of the reflective particulate 63 is not particularly restricted, a particulate of 10 µm or less is preferred to enhance the reflection efficiency. By pressing the reflective particulates 63 against the photosensitive adhesive resin film 62, the reflective particulates 63 are attached to the non-focus area 622 that is an uncured area.

Figure 17D:
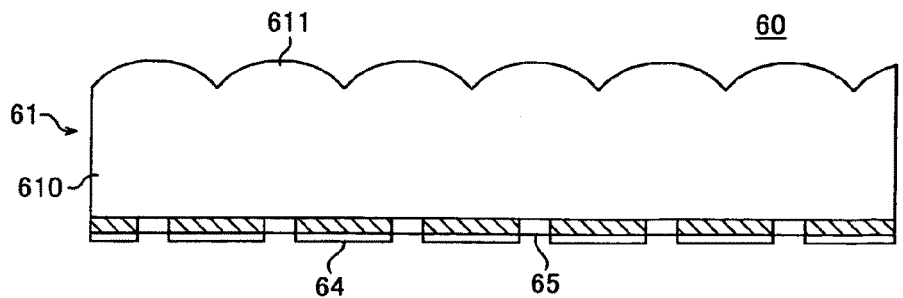

Referring then to FIG. 17D, a reflective film 64 is deposited on the non-focus area 622 to which the reflective particulates 63 are attached. Because the reflective particulates 63 are not attached to the focus area 621, the position of the focus area 621 serves as the opening 65. The focus area 621 is formed on the optical axis of the light focusing element 611; accordingly, the opening 65 exists on the optical axis. The focus area 621 is placed between the non-focus area 622, and therefore the opening 65 is placed between the reflective film 64. The optical sheet 60 according to this embodiment is thereby produced. This optical sheet 60 has the stripe-shaped openings 65, between which the reflective film 64 is placed.

As described, the manufacturing method for the optical sheet of this embodiment forms the reflective film 64 and the opening 65 by using the light focus of the light focusing element 611. This enables the formation of the reflective film 64 and the opening 65 by self aligning, thereby the alignment of these elements with the light focusing element 611 can be easily allowed. It is therefore possible to prevent an increase in manufacturing costs and design elements having desired optical properties to increase freedom of design.

Further, the light entering through the opening 65 placed between the reflective films 64 is output in the opposite direction to the light entering through the front side of the base 61 during exposure. Thus, the incoming light through the opening 65 is output from the front side of the base 61 as parallel light. It is thereby possible to further increase the directivity of light in the optical sheet 60 of this embodiment. The optical sheet 60 can enhance the directivity of light in the optical axis direction of the light focusing element 611.

Tenth Embodiment

Though the reflective film 64 is formed of the photosensitive adhesive resin film 62 in the above embodiment, the case of forming the reflective film using resist is described herein as a tenth exemplary embodiment of the present invention.

A method of manufacturing an optical sheet of this embodiment is described hereinafter with reference to FIGS. 18A to 18D. FIGS. 18A to 18D illustrate the process of manufacturing the optical sheet according to the tenth embodiment. In FIGS. 18A to 18D, the same reference symbols as in FIG. 17 illustrating the ninth embodiment designate the same elements and the detailed description of those elements is not given herein.

Figure 18A:
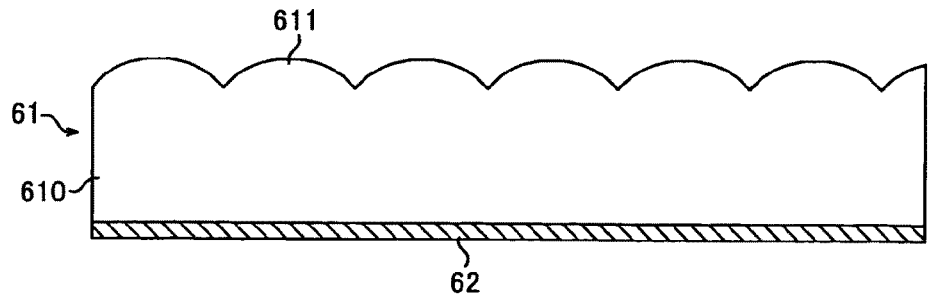
FIGS. 18A to 18D are cross-sectional views that schematically show a manufacturing process of an optical sheet according to a tenth embodiment of the present invention.

Referring first to FIG. 18A, a negative resist 72 having water repellency, instead of the photosensitive adhesive resin film 62, is coated on the backside of the base 61. The negative resist 72 may be an optically transparent material with water repellency, such as silicone-acrylic block copolymers.

Figure 18B:
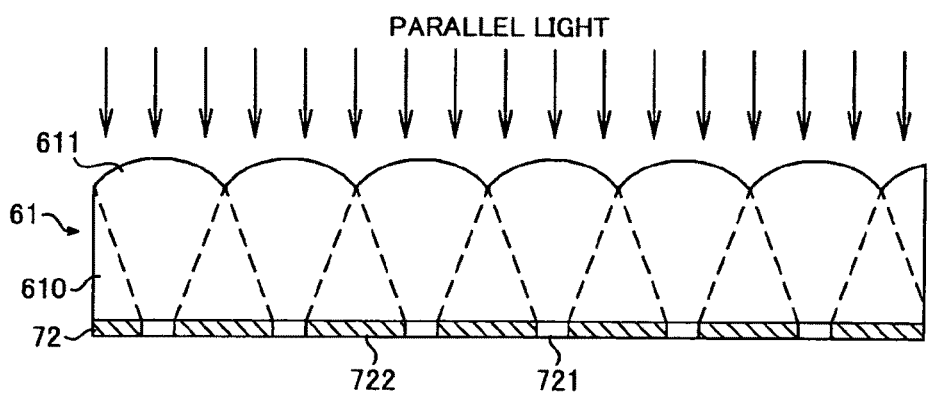

Referring next to FIG. 18B, parallel light is applied from the front side of the base 61 to expose the resist 72. As a result, the resist 72 in the focus area 721 is exposed area and the resist 72 in the non-focus area 722 different from the focus area 721 is unexposed area. Accordingly, the resist 72 is formed of an exposed, cured area (focus area 721) and a non-exposed, non-cured area (non-focus area 722).

Figure 18C:
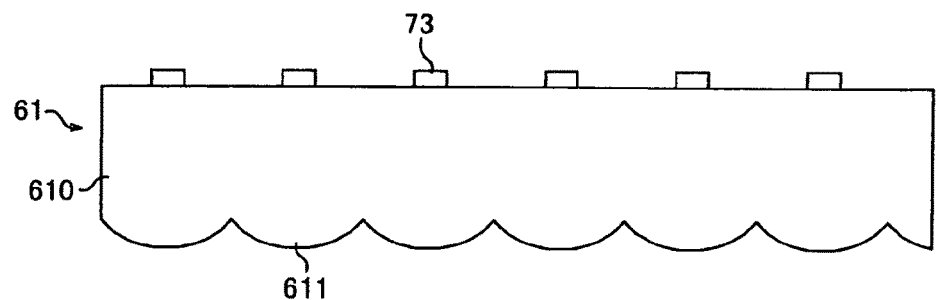
Figure 18D:
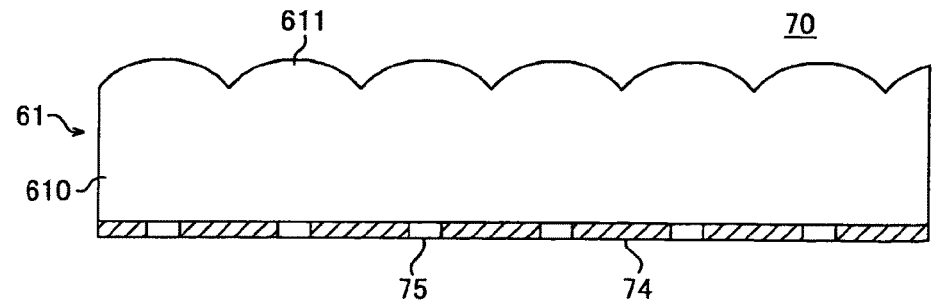

Referring then to FIG. 18C, the unexposed resist 72 is removed by developer so that the resist 72 in the focus area 721 only remains to form a resist pattern 73. The focus area 721 is formed on the optical axis of the light focusing element 611, and accordingly, the resist pattern 73 is formed on the optical axis. Referring further to FIG. 18D, the reflective particulates 63 are applied onto the backside of the base 61. The reflective particulates 63 are mixed in with a solvent and applied in this state. The solvent that forms a coating may be a material having water repellency against the water repellent resist 72, such as known organic or inorganic solvent including polyurethane resin, polyester resin and so on.

If the reflective particulates 63 and the solvent are dried, the resist pattern 73 has water repellency and thereby the reflective particulates 63 and the solvent on the resist pattern 73 are repelled. Thus, the reflective particulates 63 are not attached onto the resist pattern 73. In this way, the reflective film 74 is formed between the resist pattern 73 so that the resist pattern 73 serves as the opening 75. The resist pattern 73 is placed on the optical axis of the light focusing element 611, and the opening 75 is thus placed on the optical axis. The optical sheet 70 of this embodiment is thereby produced. This optical sheet 70 has the stripe-shaped openings 75, between which the reflective film 74 is placed.

As described, the manufacturing method for the optical sheet of this embodiment forms the reflective film 74 and the opening 75 by self-alignment, and the same advantages as the ninth embodiment can be obtained. Further, the optical sheet 70 can also enhance the directivity of light in the optical axis direction of the light focusing element 611 as in the optical sheet of the ninth embodiment.

Eleventh Embodiment

An eleventh exemplary embodiment forms the reflective film by using the resist pattern 73 as in the tenth embodiment. However, it is different from the tenth embodiment in that the opening is formed in the position of the resist pattern.

A method of manufacturing the optical sheet according to this embodiment is described hereinafter with reference to FIGS. 19A to 19E. FIGS. 19A to 19E illustrate the process of manufacturing the optical sheet. In FIGS. 19A to 19E, the same reference symbols as in the ninth and tenth embodiments designate the same elements and the detailed description of those elements is not given herein.

Figure 19A:
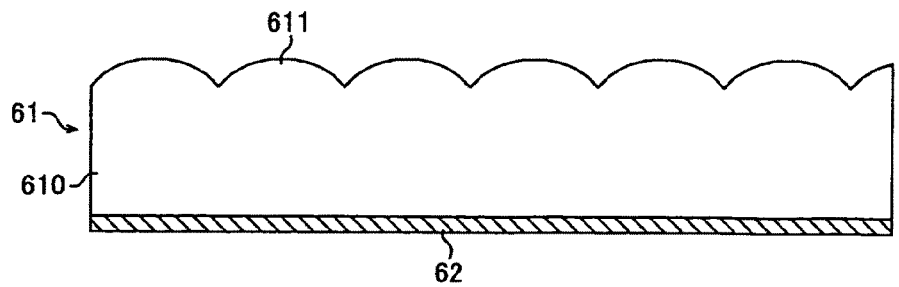
FIGS. 19A to 19E are cross-sectional views that schematically show a manufacturing process of an optical sheet according to a eleventh embodiment of the present invention.
Figure 19B:
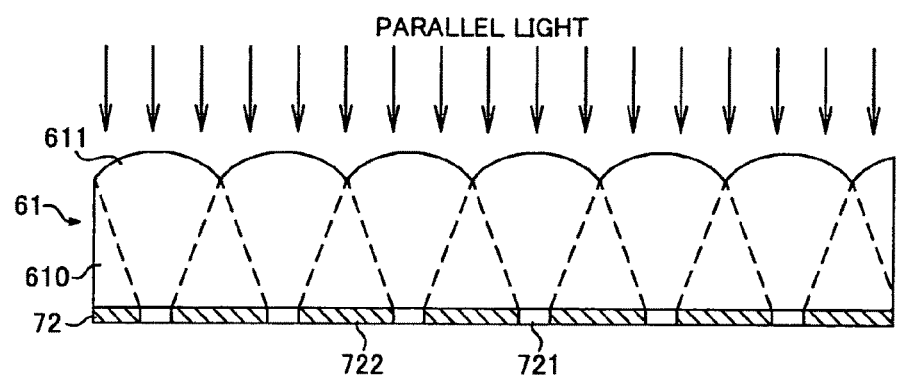
Figure 19C:
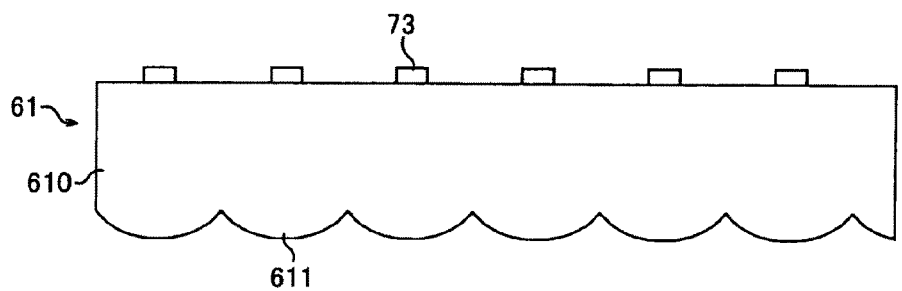

As shown in FIGS. 19A to 19C, the resist 72 of the non-focus area 722 is removed so that the resist 72 in the focus area 721 only remains on the backside of the base 61 as in the tenth embodiment. The resist pattern 73 is thereby formed on the optical axis of the light focusing element 611. The material of the resist 72 in this embodiment may be selected according to the material of the body 610. For example, if the body 610 is formed of a polymeric material such as polycarbonate, acrylic resin and PET, a water soluble resist material such as polyvinyl alcohol and casein may be used. On the other hand, if the body 610 is formed of a non-polymeric material such as glass, a solvent resist material that is used for semiconductor manufacturing or the like may be used.

Figure 19D:
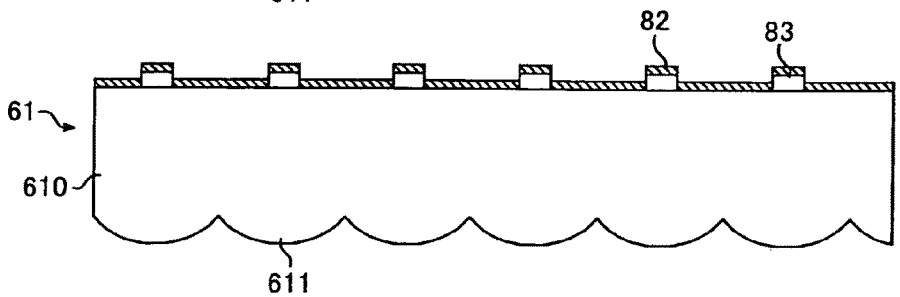

Referring then to FIG. 19D, a thin metal film 82 is formed on the backside of the base 61. The material of the thin metal film 82 may be aluminum, silver, titanium oxide, barium sulfide and soon. The thin metal film 82 may be formed by vapor deposition, sputtering, chemical vapor deposition (CVD) and so on. As shown in FIG. 19D, the thin metal film 82 is formed not only on the resist pattern 73 but also on the backside of the base 61 that exposes between the resist patterns 73.

Figure 19E:
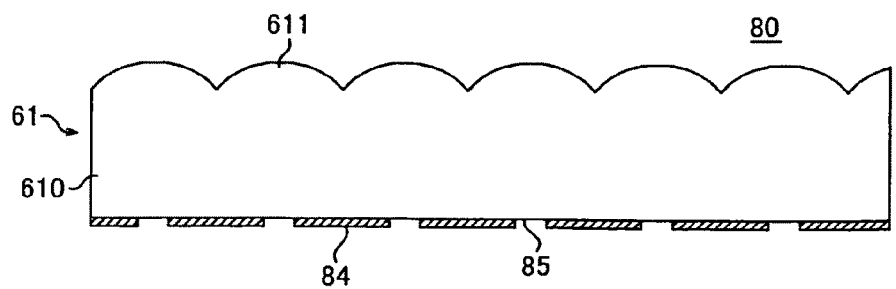

Referring then to FIG. 19E, the base 61 is washed in a resist remover to remove the resist pattern 73. Like the resist 72, the resist remover may be selected according to the material of the body 610. For example, if the resist 72 is formed of a water soluble material, the resist remover may be alkaline solution such as sodium hydroxide solution or sodium carbonate solution. If a non-polymeric material is used as the body 610 as described above, a solvent resist material is used for the resist 72, and a solvent resist remover such as tetramethylammonium hydroxide may be used accordingly.

Particularly, the base 61 that is washed in the resist remover is the optical sheet with the light focusing element 611 formed thereon. Thus, if the base 61 is contaminated by the resist remover, it affects optical design of the light focusing element 611. Therefore, the resist remover is preferably composed of the material that does not contaminates the base 61. Particularly, a polymeric material such as acrylic can be corroded by an organic solvent. The resist remover is thus preferably an acrylic solution that does not contaminate the polymeric material, and the resist 72 is preferably formed of a water soluble resist material. Further, if the resist 72 is formed of a polyvinyl alcohol water soluble resist, water may be used as the resist remover. It takes time to remove the cured resist 72 in this case, and it is preferred to use an acrylic solution.

By the removal of the resist pattern 73, the thin metal film 82 that is formed on the resist pattern 73 is also removed. On the other hand, the thin metal film 82 that is formed on the backside of the base 61 that exposes between the resist patterns 73 is not removed. The remaining thin metal film 82 forms the reflective film 84, and the portion after removing the resist pattern 73 serves as the opening 85. Since the resist pattern 73 is formed on the optical axis of the light focusing element 611, the opening 85 is formed on the optical axis. The optical sheet 80 of this embodiment is thereby produced. This optical sheet 80 has the stripe-shaped openings 85, between which the reflective film 84 is placed As described, the manufacturing method for the optical sheet of this embodiment forms the reflective film 84 and the opening 85 by self-alignment, and the same advantages as the ninth embodiment can be obtained. Further, the optical sheet 80 can also enhance the directivity of light in the optical axis direction of the light focusing element 611 as in the optical sheet 60 in the ninth embodiment.

Further, in this embodiment, the reflective film 84 is composed of the thin metal film 82 that is formed by vapor deposition or the like. The reflective film 84 thus has higher reflection characteristics compared with the adhesive mixed with the reflective particulates 63, 73 as in the ninth and tenth embodiments.

Further, forming the thin metal film 82 by using the resist pattern 73 enables accurate patterning of the reflective film 84. This allows accurate formation of the reflective film 84 even with a complicated shape. In addition, forming the reflective film 84 in this way allows the reflective film 84 to be attached to the base 61 firmly.

Twelfth Embodiment

Though the ninth to eleventh embodiments form the reflective film and the opening by self-alignment as a result of applying parallel light that is parallel to the normal direction to the base 61, the case of applying parallel light that is inclined with respect to the normal direction to the base 61 is described hereinafter as a twelfth exemplary embodiment. This embodiment describes the case of applying inclined parallel light in the ninth embodiment.

A method of manufacturing the optical sheet 60 according to this embodiment is described hereinafter with reference to FIGS. 20A to 21B. FIGS. 20A to 21B illustrate the process of manufacturing the optical sheet according to this embodiment. In FIGS. 20A to 21B, the same reference symbols as in the ninth and eleventh embodiments designate the same elements and the detailed description of those elements is not given herein.

Figure 20A:
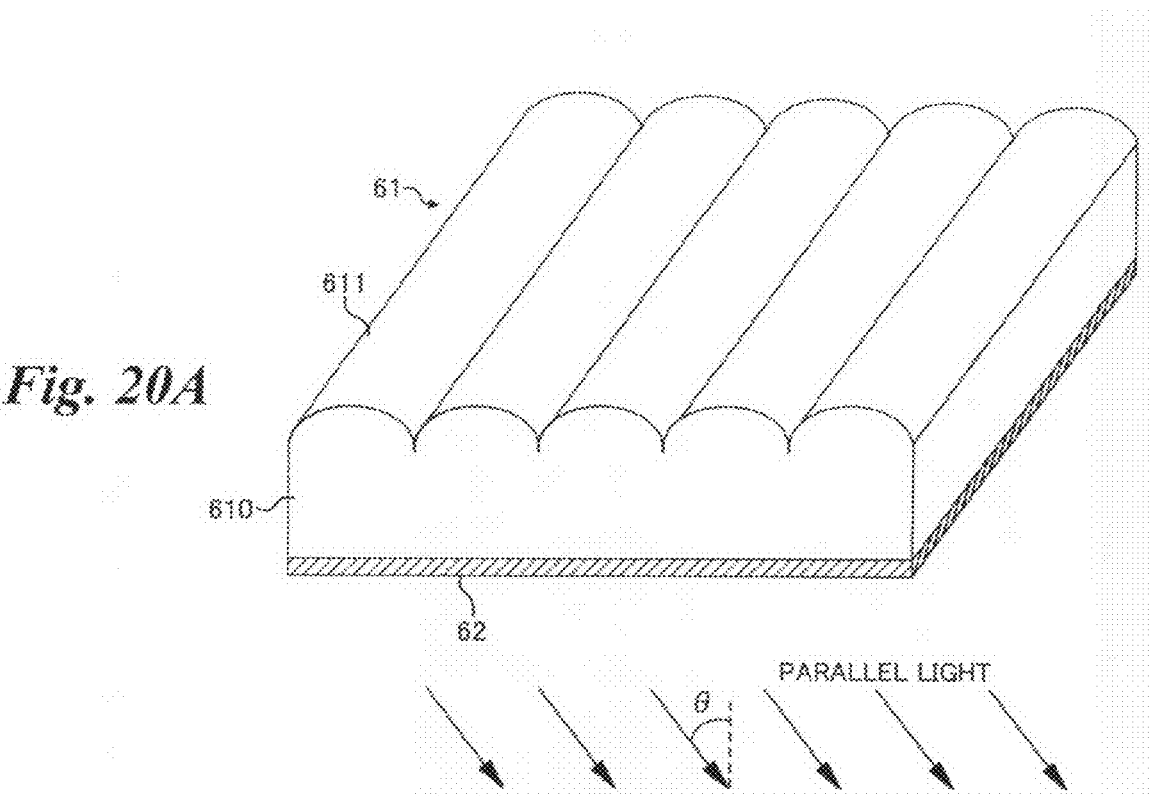
FIGS. 20A and 20B are cross-sectional views that schematically show a manufacturing process of an optical sheet according to a twelfth embodiment of the present invention.
Figure 20B:
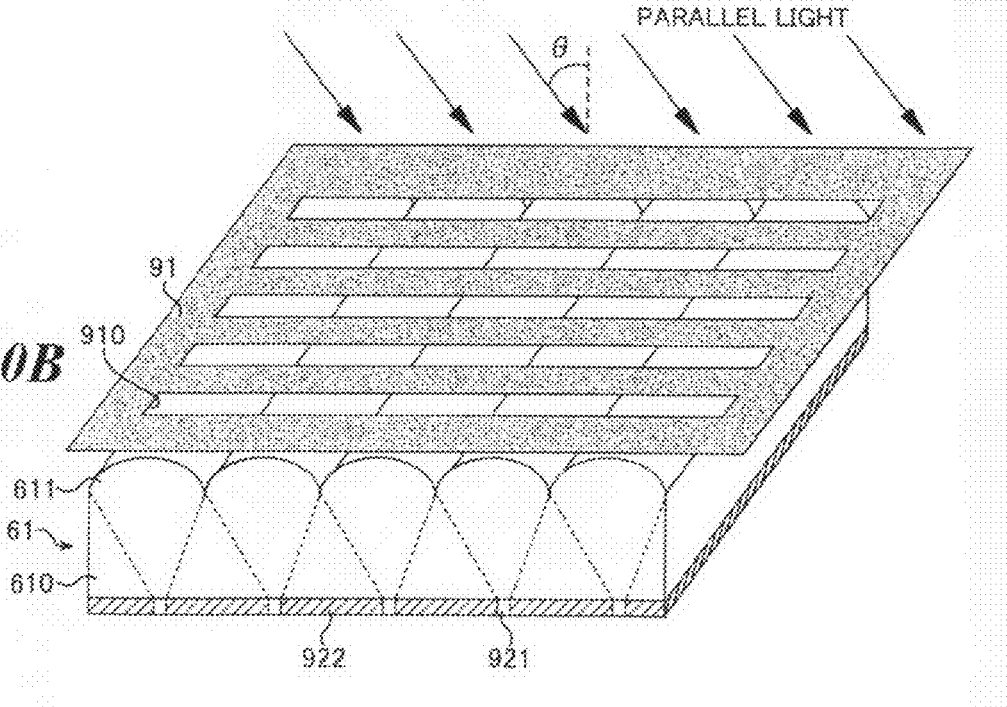

As shown in FIG. 20A, the photosensitive adhesive resin film 62 is deposited on the backside of the body 610 of the base 61. Then, on the light focusing element 611 formed on the base 61, a photomask 91 having a plurality of stripe-shaped open light shielding patterns 910 is placed as shown in FIG. 20B. Specifically, the photomask 91 is placed so that the longitudinal direction of the light shielding pattern 910 and the longitudinal direction of the light-focusing element 611 are perpendicular to each other. In this state, parallel light is applied in the direction inclined with respect to the sheet plane of the base 61.

The applied parallel light passes through the light shielding pattern 910 of the photomask 91 and is focused by the light-focusing element 611. The parallel light is applied in the direction that is tilted at an angle of θ to the normal of the base 61 on the plane including the longitudinal direction of the light shielding pattern 910 of the photomask 91. Therefore, the focus area 921 is formed in the light focusing element 611 at the position deviated from its central axis to the longitudinal direction of the light shielding pattern 910. Because a plurality of stripe-shaped light shielding patterns 910 are placed, there are a plurality of focus areas 921 separated from each other in the longitudinal direction of the light focusing element 611.

Figure 21A:
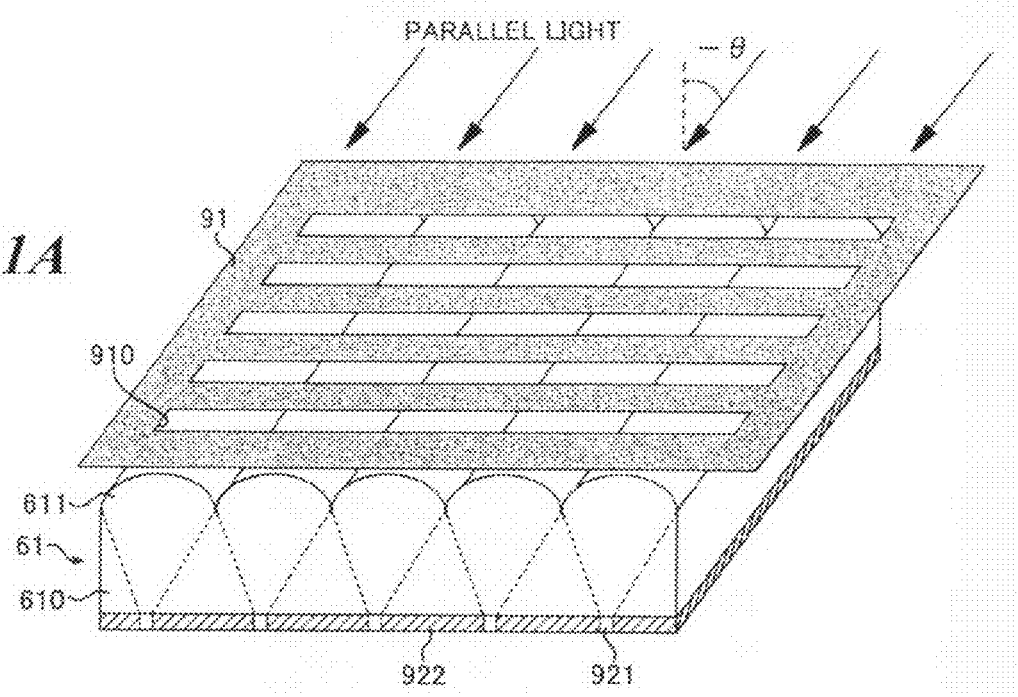
FIGS. 21A and 21B are cross-sectional views that schematically show a manufacturing process of an optical sheet according to the twelfth embodiment of the present invention.

Then, the photomask 91 is displaced by the width of the light shielding pattern 910 in the longitudinal direction of the light focusing element 611 as shown in FIG. 21A. In this state, parallel light is applied in the direction tilted at an angle of −θ to the normal of the base 61. Thus, the parallel light is applied in this time in the direction tilted opposite to the parallel light that is applied before displacing the photomask 91. The focus area 922 is thereby formed on the opposite side of the focus area 921 with respect to the central axis of the light focusing element 611. Because the photomask is displaced in the longitudinal direction of the light focusing element 611, the focus area 922 is displaced by the width of the light shielding pattern 910. The focus areas 921 and 922 formed in this way are arranged in staggered fashion.

Figure 21B:
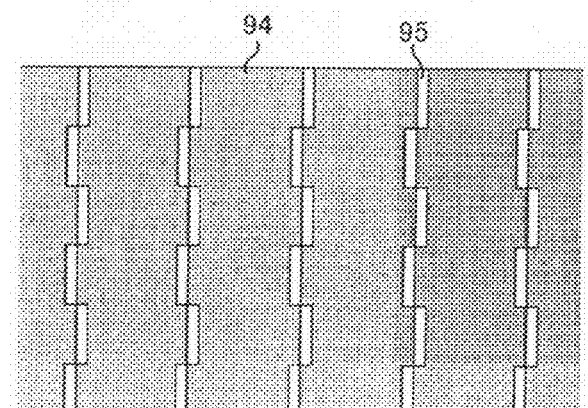

As shown in FIG. 21B, the focus areas 921 and 922 serve as the openings 931 and 932, respectively, as in the ninth embodiment. A plurality of openings 931 and 932 are placed in staggered pattern on both sides of the central axis of the light focusing element 611. Specifically, the openings 931 and 932 are rectangular and arranged alternately on both sides along the longitudinal direction of the light focusing element 611. The optical sheet 90 of this embodiment is thereby produced. This optical sheet 90 has the openings 931 and 932 having complicated plane shapes different from stripe shapes, in the vicinity of which the reflective film 94 is placed.

As described, the manufacturing method of the optical sheet according to this embodiment applies parallel light in the direction inclined with respect to the normal to the base 61. This enables easy formation of the openings 931 and 932 in the positions deviated from the central axis of the light focusing element 611. Further, the optical sheet 90 can increase the directivity of light in the direction inclined (tilted at ±θ) with respect to the optical axis direction of the light focusing element 611.

Furthermore, by changing the position of the photomask 91 for restricting the area to apply the parallel light, it is possible to easily change the shapes of the openings 931 and 932 into various shapes. Thus, the optical sheet 90 can increase the directivity of light more easily.

Though this embodiment describes the case of applying the inclined parallel light in the structure of the ninth embodiment, the inclined parallel light may be applied in the structures of the tenth and eleventh embodiments. Further, it is possible to form the openings arranged in complicated pattern like in the tenth and eleventh embodiments as well.

In the ninth to twelfth embodiments, it is feasible to form a protection film by an optically transparent member such as acrylic resin after forming the reflective film 64, 74, 84, 94. This enables protection of the reflective film 64, 74, 84, 94 from peel-off.

Examples of the lighting apparatus according to this invention are described in detail hereinbelow. After describing Example 1 to 6, Comparative Example to those examples is described.

Example 1

The optical sheet of Example 1 is an example of the first embodiment. Specifically, the lenticular lens sheet having the structure illustrated in FIG. 1B is produced as the optical sheet 13 by hot embossing. Acrylic with a refractive index of 1.5 is used as a forming material, and the curvature radius of the lenticular lens (lens portion 135) is 45 µm, and the thickness from the lens top to the sheet backside is 120 µm.

On the backside (smooth surface) of the optical sheet 13, a reflective metal is deposited by sputtering and an opening 132 is formed by photolithography. The reflector 131 is thereby formed on the backside of the optical sheet 13. Materials having different reflectance, such as magnesium carbonate, silver, aluminum, chrome, and nickel are used as a reflective material and sputtered, thereby producing samples with different reflectance.

On the inner surface of the housing 12 also, the similar reflective material is deposited by sputtering to produce samples with different reflectance. The opening 132 is slit-like with an opening width of 10 µm. The opening 132 is formed on the optical axis of the lenticular lens (lens portion 135) and several types of optical sheets 13 are formed. The optical sheet 13 is attached to the light exit port 120 of the housing 12, thereby producing the lighting apparatus 1. The luminance characteristics of the lighting apparatus 1 are measured.

FIG. 22 shows the viewing angle dependence of the luminance of the lighting apparatus 1. In the graph of FIG. 22, the measurement A1 is a measurement result of luminance characteristics in Example 1, and C1 is a measurement result of luminance characteristics in Comparative Example 1. The graph of FIG. 22 shows the relative luminance when the peak luminance intensity of Comparative Example 1 is 1.

As shown in FIG. 22, the comparison between the optical sheet 13 of Example 1 and the optical sheet of Comparative Example shows that the front luminance (angle 0°) of Example 1 drastically increases within a very small angle range. Accordingly, the use of the optical sheet 13 according to an embodiment of the present invention can enhance the directivity in the normal direction.

Figure 23:
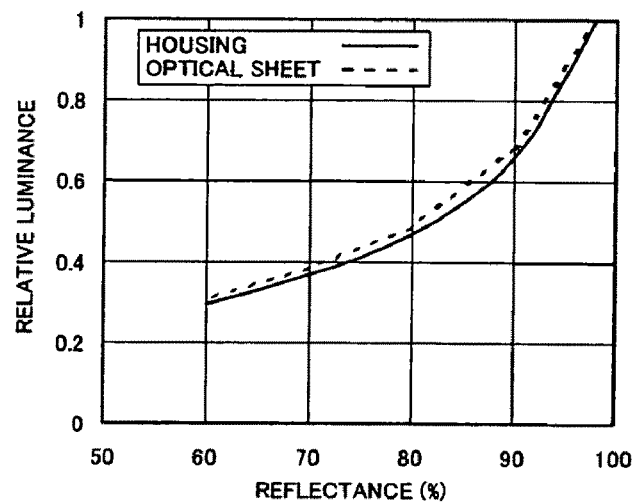
FIG. 23 is a graph that shows a relationship between reflectance of a reflector and luminance of an optical sheet according to an embodiment of the present invention.

FIG. 23 shows the relationship between the reflectance and the luminance of the housing 12 and the optical sheet 13 in Example 1. In the graph of FIG. 23, the full line indicates the relationship between the reflectance of the inner surface of the housing 12 and the luminance, and the dotted line indicates the relationship between the reflectance of the reflector 131 and the luminance.

The graph of FIG. 23 tells that the luminance decreases to half or less when the reflectance falls below 80%. This means that the significantly sharp light focusing characteristics can be obtained by forming the inner surface of the housing 12 and the reflector 131 of the optical sheet 13 in such a way that visible light is reflected at an average reflectance of 80% or higher.

Example 2

The optical sheet of Example 2 is another example of the first embodiment which has a flat portion between lenses. The structure of Example 2 is the similar to that of Example 1 except that the flat portion is formed. The curvature radius of the lenticular lens (lens portion 235) is 20 µm, and the thickness from the lens top to the sheet backside is 55 µm. The focal position of the lens portion is in the vicinity of the opening. A flat portion (flat portion 136) is formed between adjacent lenticular lenses (lens portions 235). A plurality of samples with different widths of flat portion are produced.

On the backside (smooth surface) of the optical sheet 33, silver is deposited by sputtering and the opening 332 is formed by photolithography. The reflector 331 is thereby formed on the backside of the optical sheet 33. The opening 332 is slit-like with an opening width of 10 µm. The opening 332 is formed on the optical axis of the lenticular lens (lens portion 335) and the optical sheet 33 is thereby produced. The optical sheet 33 is attached to the light exit port 120 of the housing 12, thereby producing the lighting apparatus 1. The luminance characteristics of the lighting apparatus 1 are measured.

FIG. 24 shows the viewing angle dependence of the luminance of the lighting apparatus 1. In the graph of FIG. 24, the measurement A2 is a measurement result of luminance characteristics in Example 2, and C2 is a measurement result of luminance characteristics in Comparative Example 1. The graph of FIG. 24 shows the relative luminance when the peak luminance intensity of Comparative Example 1 is 1. FIG. 24 indicates the measurement results when the distance between the lenticular lenses in Example 2 is 10 µm, which is, the width of the flat portion 336 is 10 µm.

As shown in FIG. 24, the use of the optical sheet 33 of Example 2 results in the luminance peak such that the main peak A20 only occurs in the normal direction. Thus, by forming the flat portion 336 between the lenses 335, it is able to substantially eliminate sub-peaks to enhance the directivity in the normal direction.

Figure 25:
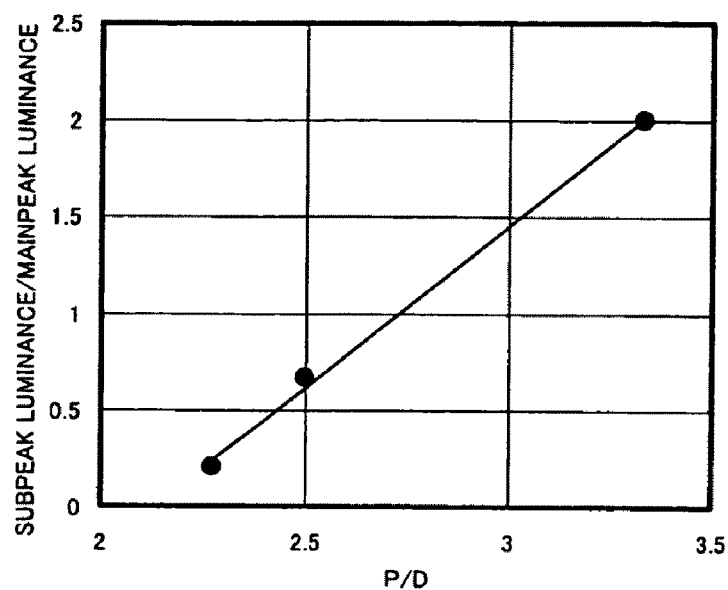
FIG. 25 is a graph that shows a ratio of a main peak and a sub-peak of a lighting apparatus according to an embodiment of the present invention.

FIG. 25 shows the ratio of a main peak and a sub-peak when the width of the flat portion 336 is changed in the optical sheet 33 of Example 2. If the ratio P/D of the lens pitch P2 and the distance D2 from the opening to the lens end is 2.4 or less, the sub-peak decreases to half or less of the main peak.

Example 3

The optical sheet of Example 3 is an example of the third embodiment. Specifically, the lenticular lens sheet having the structure illustrated in FIG. 6 is produced as the optical sheet 33 by hot embossing. Acrylic with a refractive index of 1.5 is used as a forming material, and the curvature radius of the lenticular lens (lens portion 335) is 45 μm, and the thickness from the lens top to the sheet backside is 120 μm. A flat portion (flat portion 336) is formed between adjacent lenticular lenses (lens portions 335). Several types of samples with different widths of flat portion are thereby produced.

On the backside (smooth surface) of the optical sheet 33, reflective metal is deposited by sputtering and the linear openings 332 are formed by photolithography. The reflector 331 is thereby formed on the backside of the optical sheet 33. Materials having different reflectance, such as magnesium carbonate, silver, aluminum, chrome, and nickel are used as a reflective material and sputtered, thereby producing samples with different reflectance. On the inner surface of the housing 12 also, the similar reflective material is deposited by sputtering to produce samples with different reflectance. The optical sheet 33 is attached to the light exit port 120 of the housing 12, thereby producing the lighting apparatus 1. The luminance characteristics of the lighting apparatus 1 are measured.

Figure 13:
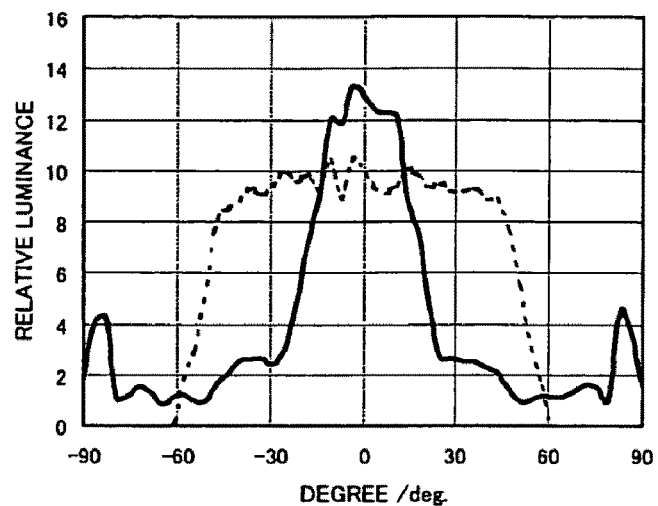
FIG. 13 is a graph that shows an example of luminance characteristics of a lighting apparatus according to an embodiment of the present invention.

FIG. 13 shows the viewing angle dependence of the luminance of the lighting apparatus 1. In the graph of FIG. 13, the full line indicates a measurement result of luminance characteristics in Example 3, and the dotted line indicates a measurement result of luminance characteristics in Comparative Example 1. The graph of FIG. 13 shows the relative luminance when the peak luminance intensity of Comparative Example 1 is 1.

As shown in FIG. 13, the comparison between the optical sheet 13 of Example 3 and the optical sheet of Comparative Example shows that the front luminance (angle 0°) of Example 3 drastically increases within a very small angle range. Accordingly, the use of the optical sheet 13 according to an embodiment of the present invention can enhance the directivity in the normal direction.

Example 4

Example 4 produces the optical sheet 41 shown in FIG. 4A. Specifically, the lenticular lens sheet of Example 1 is formed and the linear openings 411 and 412 arranged in parallel are formed thereon. The openings 411 and 412 are formed in such positions that output light is tilted at about 15° with respect to the optical sheet plane. The optical sheet 33 is attached to the light exit port 120 of the housing 12, thereby producing the lighting apparatus 1. The luminance characteristics of the lighting apparatus 1 are measured.

Figure 14:
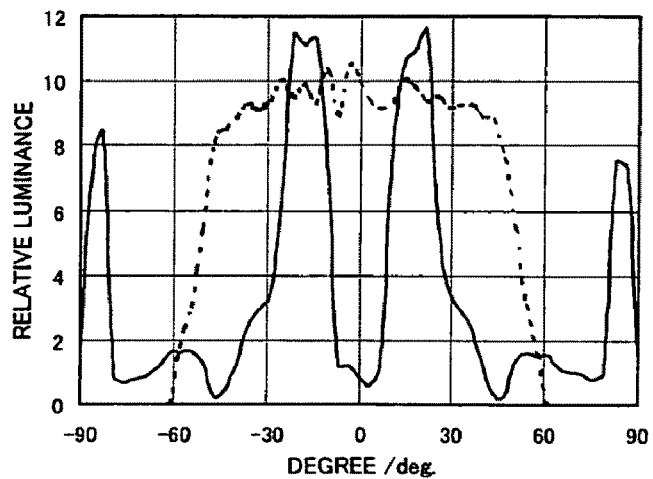
FIG. 14 is a graph that shows an example of luminance characteristics of a lighting apparatus according to an embodiment of the present invention.

FIG. 14 shows the viewing angle dependence of the luminance of the lighting apparatus 1. In the graph of FIG. 14, the full line indicates a measurement result of luminance characteristics in Example 4, and the dotted line indicates a measurement result of luminance characteristics in Comparative Example 1. The graph of FIG. 14 shows the relative luminance when the peak luminance intensity of Comparative Example 1 is 1.

As shown in the graph of FIG. 14, the angle of light focus changes by displacing the positions of the openings 411 and 412 away from the optical axis of the lens portion 135. The luminance at the positions tilted ±15° from the normal is high.

In this way, by changing the positions of the openings 411 and 412, it is possible to control the angle of light focus.

Example 5

The optical sheet of Example 5 is principally an example of the fifth embodiment. The lenticular lens sheet having the structure illustrated in FIGS. 5A and 5B is produced as the optical sheet 42 by hot embossing. Acrylic with a refractive index of 1.5 is used as a forming material, and the curvature radius of the lenticular lens (lens portion 133) is 50 μm, and the thickness from the lens top to the sheet backside is 120 μm. Additionally, a flat portion (flat portion 236) is formed between adjacent lenticular lenses (lens portions 133) like the third embodiment. A plurality of samples with different widths of flat portion are produced.

On the backside (smooth surface) of the optical sheet 42, silver is deposited by sputtering and the opening 421 is formed by photolithography. The reflector 131 is thereby formed on the backside of the optical sheet 42. The opening 421 is wave-shaped with an opening width of 10 μm. The opening 421 is formed on the optical axis of the lenticular lens (lens portion 133) and the optical sheet 42 is thereby produced. The optical sheet 42 is attached to the light exit port 120 of the housing 12, thereby producing the lighting apparatus 1. The luminance characteristics of the lighting apparatus 1 are measured.

Figure 15:
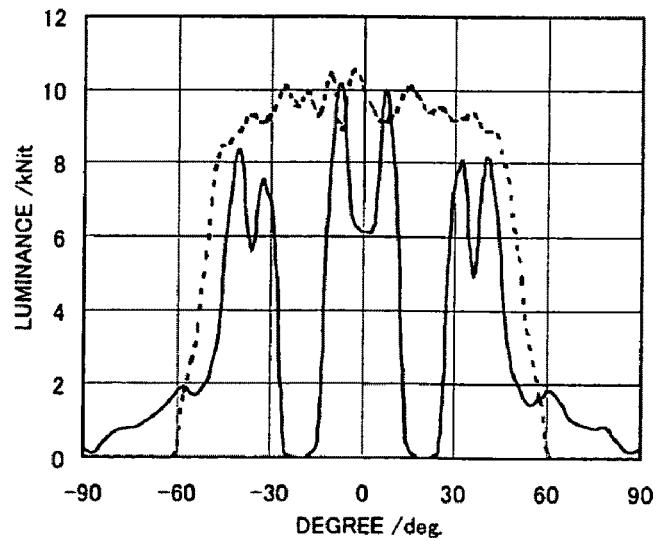
FIG. 15 is a graph that shows an example of luminance characteristics of a lighting apparatus according to an embodiment of the present invention.

FIG. 15 shows the viewing angle dependence of the luminance of the lighting apparatus 1. In the graph of FIG. 15, the full line indicates a measurement result of luminance characteristics in Example 5, and the dotted line indicates a measurement result of luminance characteristics in Comparative Example 1. The graph of FIG. 15 shows the relative luminance when the peak luminance intensity of Comparative Example 1 is 1.

As shown in the graph of FIG. 15, the angle of light focus changes by displacing the positions of the openings 421 and 422 away from the optical axis of the lens portion 133. The luminance is high at the normal position and the positions tilted ±15° from the normal. In this way, by changing the positions of the openings 421 and 422, it is possible to control the angle of light focus.

Example 6

The optical sheet of Example 6 is an example of the sixth embodiment. The micro lens array sheet having the structure illustrated in FIG. 11 is produced as the optical sheet 52 by hot embossing. Acrylic with a refractive index of 1.5 is used as a forming material, and the curvature radius of the micro lens (lens portion 525) of the lens structure 523 is 50 μm, and the thickness from the lens top to the sheet backside is 120 μm.

On the backside (smooth surface) of the optical sheet 52, silver is deposited by sputtering and the reflector 521 and the opening 522 are formed by photolithography as shown in FIG. 11. The reflector 521 is thereby formed on the backside of the optical sheet 52. The opening 522 is torus-shaped centering on the optical axis of the micro lens (lens portion 525). The opening 522 is formed in such a position that output light is tilted at about 15° with respect to the optical sheet plane. The optical sheet 52 is attached to the light exit port 120 of the housing 12, thereby producing the lighting apparatus 1. The luminance characteristics of the lighting apparatus 1 are measured.

Figure 16:
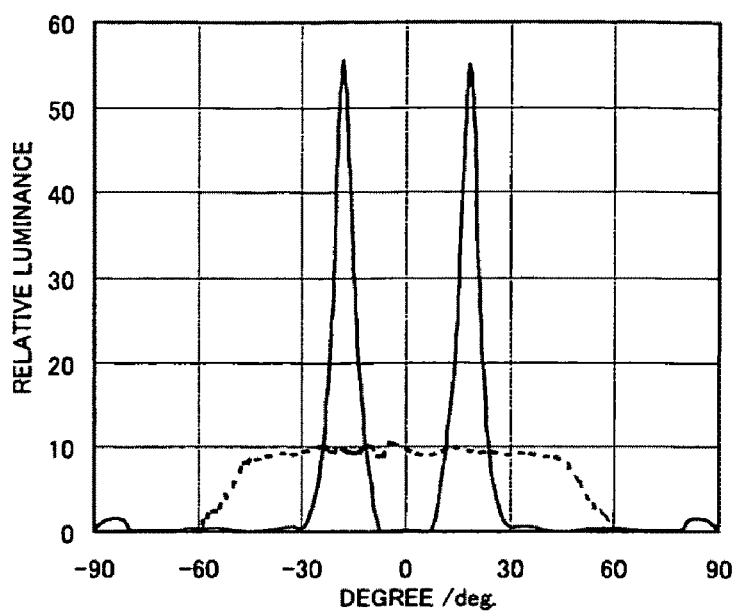
FIG. 16 is a graph that shows an example of luminance characteristics of a lighting apparatus according to an embodiment of the present invention.

The FIG. 16 shows the viewing angle dependence of the luminance of the lighting apparatus 1. In the graph of FIG. 16, the full line indicates a measurement result of luminance characteristics in Example 6, and the dotted line indicates a measurement result of luminance characteristics in Comparative Example 1. The graph of FIG. 16 shows the relative luminance when the peak luminance intensity of Comparative Example 1 is 1.

As shown in the graph of FIG. 16, the angle of light focus changes by displacing the position of the opening 522 away from the optical axis of the lens portion 525. The luminance is high at the positions tilted ±15° from the normal. In this way, by changing the position of the opening 522, it is possible to control the angle of light focus.

Comparative Example

Figure 12:
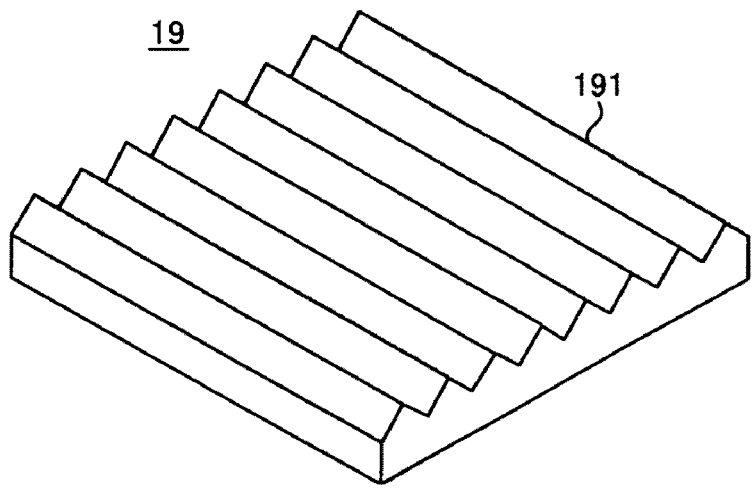
FIG. 12 is a perspective view that schematically shows an example of an optical sheet according to a related art.

A triangular prism sheet 19 having the structure as illustrated in FIG. 12 is formed by hot embossing. Acrylic with a refractive index of 1.5 is used as a forming material, and the thickness from the prism top to the sheet backside is 120 μm. The apex angle of the triangular prism sheet 19 is 90° and the lens pitch is 50 μm. The optical sheet is attached to a light exit port of a housing, thereby producing a conventional lighting apparatus, and the luminance characteristics are measured.

The viewing angle dependence of the luminance of the conventional lighting apparatus is as shown in FIGS. 13 to 16 that indicate the measuring results of Examples 3 to 6. It is possible to control the luminance angle distribution of the optical sheet into various patterns by the shape of the opening as in Examples 1 to 6.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of manufacturing an optical sheet that includes a transparent base, a plurality of light focusing elements that are formed on a first surface of the base, a photosensitive resin layer that is formed on a second surface of the base which opposes the first surface, and a plurality of openings that are formed in the photosensitive resin layer, the method comprising:
   forming the photosensitive resin layer on the second surface;
   placing a photomask that has a light shielding pattern over at least one of the plurality of light focusing elements;
   applying parallel light at a first angle with respect to a normal of the base through the photomask and focusing the light using the at least one of the plurality of light focusing elements;
   applying parallel light at a second angle with respect to the normal of the base through the photomask and focusing the light using the at least one of the plurality of light focusing elements, the second angle being different from the first angle;
   forming the plurality of openings in the photosensitive resin layer at the positions where the parallel light at the first and second angles is focused on the resin layer by the at least one of the plurality of light focusing elements,
   wherein focus areas formed by the at least one of the plurality of light focusing elements at the positions in the photosensitive resin layer are deviated from a central axis of the light shielding pattern to a longitudinal direction of the light shielding pattern.

2. The method of manufacturing an optical sheet according to claim 1, further comprising:
   pressing reflective particulates against the photosensitive resin layer; and
   forming a reflective film by attaching the pressed reflective particulates to a non-exposed area of the photosensitive resin layer.

3. The method of manufacturing an optical sheet according to claim 1, wherein the plurality of openings comprises openings that are positioned corresponding to the parallel light at the first angle, and openings that are positioned corresponding to the parallel light at the second angle.

4. The method of manufacturing an optical sheet according to claim 1, wherein the photomask is placed so that the longitudinal direction of the light shielding pattern and the longitudinal direction of the at least one of the plurality of light focusing elements are perpendicular to each other.

5. The method of manufacturing an optical sheet according to claim 1, wherein the plurality of openings are placed in a staggered pattern on both sides of the central axis of the at least one of the plurality of light focusing elements.

6. A method of manufacturing an optical sheet that includes a transparent base, a plurality of light focusing elements that are formed on a first surface of the base, an optically transparent and water repellant photosensitive resin layer that is formed on a second surface of the base which opposes the first surface, and a plurality of openings that are formed in the photosensitive resin layer, the method comprising:
   forming the optically transparent and water repellent photosensitive resin layer on the second surface;
   placing a photomask that has a light shielding pattern over at least one of the plurality of light focusing elements;
   applying parallel light through the photomask and focusing the light using the at least one of the plurality of light focusing elements;
   exposing selectively the photosensitive resin layer to the focused light;
   removing the photosensitive resin layer in a non-exposed area different from an exposed area to expose the second surface and form a plurality of openings in the photosensitive resin layer;
   applying reflective particulates and solvent onto the second surface at positions where the photosensitive resin layer has been removed and the photosensitive resin layer to form a coating of the solvent including the reflective particulates on the photosensitive resin layer in the exposed area;
   drying the applied reflective particulates and solvent to be attached to the second surface at positions where the photosensitive resin layer has been removed to form a reflective film; and
   repelling the reflective particulates and solvent applied on the photosensitive resin layer in the exposed area by the drying to form an opening in the reflective film corresponding to the exposed area of the photosensitive resin layer,
   wherein the incident angle of the parallel light with respect to a normal of the base is changed in order to shift the position of the opening in the reflective film, and focus areas formed by the at least one of the plurality of light focusing elements at the positions in the photosensitive resin layer are deviated from a central axis of the light shielding pattern to a longitudinal direction of the light shielding pattern.

7. The method of manufacturing an optical sheet according to claim 6, wherein the solvent has water repellency against the photosensitive resin layer.

8. A method of manufacturing an optical sheet that includes a transparent base, a plurality of light focusing elements that are formed on a first surface of the base, a photosensitive resin layer that is formed on a second surface of the base which opposes the first surface, and a plurality of openings that are formed in the photosensitive resin layer, the method comprising:

forming the photosensitive resin layer on the second surface;

placing a photomask that has a light shielding pattern over at least one of the plurality of light elements;

applying parallel light through the photomask and focusing the light using the at least one of the plurality of light focusing elements;

exposing selectively the photosensitive resin layer to the focused light;

removing the photosensitive resin layer in a non-exposed area different from an exposed area to expose the second surface;

applying a thin metal film onto the second surface at positions where the photosensitive resin layer has been removed to form the reflective film;

removing the photosensitive resin layer in the exposed area and the thin metal film formed on the photosensitive resin layer to form at least one of the plurality of openings in the photosensitive resin layer, wherein the incident angle of the parallel light with respect to a normal of the base is changed in order to shift the position of the at least one of the plurality of openings in the photosensitive resin layer and focus areas formed by the at least one of the plurality of light focusing elements at the positions in the photosensitive resin layer are deviated from a central axis of the light shielding pattern to a longitudinal direction of the light shielding pattern.

9. A method of manufacturing an optical sheet that includes a transparent base, a plurality of light focusing elements that are formed on a first surface of the base, a photosensitive resin layer that is formed on a second surface of the base which opposes the first surface, and a plurality of openings that are formed in the photosensitive resin layer, the method comprising:

forming the photosensitive resin layer on the second surface;

placing a photomask that has a light shielding pattern over at least one of the plurality of light focusing elements;

applying parallel light through the photomask at a first position and focusing the light using the at least one of the plurality of light focusing elements;

applying parallel light through the photomask at a second position and focusing the light using the at least one of the plurality of light focusing elements, the second position being different from the first position; and forming the plurality of openings in the photosensitive resin layer, the plurality of openings comprising openings that are positioned corresponding to the first position of the photomask, and openings that are positioned corresponding to the second position of the photomask;

wherein focus areas formed by the at least one of the plurality of light focusing elements at the positions in the photosensitive resin layer are deviated from a central axis of the light shielding pattern to a longitudinal direction of the light shielding pattern.

* * * * *